US012139271B2

(12) United States Patent
Khosla et al.

(10) Patent No.: US 12,139,271 B2
(45) Date of Patent: Nov. 12, 2024

(54) FUEL RECEPTACLE AND BOOM TIP POSITION AND POSE ESTIMATION FOR AERIAL REFUELING

(71) Applicant: The Boeing Company, Chicago, IL (US)

(72) Inventors: Deepak Khosla, Camarillo, CA (US); Leon Nguyen, Tarzana, CA (US); William Kentarou Kaneko Leach, Castro Valley, CA (US); Justin C. Hatcher, Sumner, WA (US); James L. Clayton, Meridian, ID (US); Yifan Yang, Kirkland, WA (US); Paul S. Idell, Thousand Oaks, CA (US); Fan Hin Hung, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/565,437

(22) Filed: Dec. 29, 2021

(65) Prior Publication Data
US 2022/0212811 A1 Jul. 7, 2022

Related U.S. Application Data

(60) Provisional application No. 63/134,085, filed on Jan. 5, 2021.

(51) Int. Cl.
*B64D 39/04* (2006.01)
*B64D 39/06* (2006.01)

(52) U.S. Cl.
CPC ............ *B64D 39/04* (2013.01); *B64D 39/06* (2013.01)

(58) Field of Classification Search
CPC ........ B64D 39/00; B64D 39/04; B64D 39/06; G06V 10/46; G06V 20/17; G01C 21/28; G01C 21/20
See application file for complete search history.

(56) References Cited

U.S. PATENT DOCUMENTS 5,499,784 A * 3/1996 Crabere ................. B64D 39/00
345/635
5,904,729 A * 5/1999 Ruzicka ................. B64D 39/00
244/135 R
(Continued)

FOREIGN PATENT DOCUMENTS

WO WO-2009152091 A2 * 12/2009 ............. B64D 39/00
WO WO-2022014354 A1 * 1/2022 ............... G06T 7/70

OTHER PUBLICATIONS

Doebbler, et al., "Boom and Receptacle Autonomous Air Refueling Using Visual Snake Optical Sensor", Journal of Guidance and Control and Dynamics., vol. 30, No. 6, Nov. 1, 2007, 24 pages.
(Continued)

*Primary Examiner* — Richard Green
*Assistant Examiner* — Nevena Aleksic
(74) *Attorney, Agent, or Firm* — Jordan IP Law, LLC

(57) ABSTRACT

Aspects of the disclosure provide fuel receptacle and boom tip position and pose estimation for aerial refueling. A video frame is received and within the video frame, aircraft keypoints for an aircraft to be refueled are determined. Based on at least the aircraft keypoints, a position and pose of a fuel receptacle on the aircraft is determined. Within the video frame, a boom tip keypoint for a boom tip of an aerial refueling boom is also determined. Based on at least the boom tip keypoint, a position and pose of the boom tip is determined. Based on at least the position and pose of the fuel receptacle and the position and pose of the boom tip, the aerial refueling boom is controlled to engage the fuel receptacle. Some examples overlay projections of an aircraft model on displayed video for a human observer.

20 Claims, 15 Drawing Sheets

(56) References Cited

U.S. PATENT DOCUMENTS

| | | | |
|---|---|---|---|
| 9,150,310 B1* | 10/2015 | Bray | B64D 39/00 |
| 9,437,113 B2 | 9/2016 | Bush et al. | |
| 9,840,336 B2 | 12/2017 | Barsheshet et al. | |
| 11,074,717 B2* | 7/2021 | Tremblay | G06N 3/08 |
| 2003/0026505 A1* | 2/2003 | Florent | G06T 1/20 |
| | | | 382/303 |
| 2003/0209633 A1* | 11/2003 | Thal | B64D 39/06 |
| | | | 244/135 A |
| 2010/0274444 A1 | 10/2010 | Williamson et al. | |
| 2010/0321011 A1 | 12/2010 | Small et al. | |
| 2014/0216088 A1 | 8/2014 | Weber | |
| 2017/0301109 A1* | 10/2017 | Chan | G06V 20/17 |
| 2018/0210466 A1 | 7/2018 | Weaver et al. | |
| 2019/0122073 A1* | 4/2019 | Ozdemir | G06V 20/56 |
| 2019/0382126 A1 | 12/2019 | Rix et al. | |
| 2020/0379486 A1 | 12/2020 | Khosla et al. | |
| 2021/0039804 A1* | 2/2021 | Ropers | B64D 39/06 |
| 2021/0403175 A1 | 12/2021 | Kyono et al. | |

OTHER PUBLICATIONS

Anderson, et al., "Augmenting Flight Imagery from Aerial Refueling", In Proceedings of ISVC 2019, LNCS 11845, pp. 154-165, 2019.

Vendra, et al., "Addressing corner detection issues for machine vision based UAV aerial refueling", Machine Vision and Applications, Springer, Berlin, DE, vol. 18, No. 5, Jan. 10, 2007, pp. 261-273.

Duan, et al., "Visual Measurement in Simulation Environment for Vision-Based UAV Autonomous Aerial Refueling", IEEE Transactions on Instrumentation and Measurement, IEEE, USA, vol. 64, No. 9, Sep. 1, 2015, pp. 2468-2480.

Cui, et al., "Visual Serving of a Flexible Aerial Refueling Boom With an Eye-in-Hand Camera", IEEE Transactions on Systems, Man, and Cybernetics: Systems, IEEE, Piscataway, NJ, USA, vol. 51, No. 10, Jan. 8, 2020, pp. 6282-6292.

"Extended European Search Report Issued in European Patent Application No. 21205493.6", dated Mar. 31, 2022, 11 Pages.

Communication from the EP Patent Office, Application No. 21205493.6, dated Nov. 22, 2023, 6 pages.

Zhang et al., "Binocular Pose Estimation for UAV Autonomous Aerial Refueling via Brain Storm Optimization," Conference: 2019 IEEE Congress on Evolutionary Computation (CEC), 8 pages. DOI:10.1109/CEC.2019.8789952.

Duan et al., "A binocular vision-based UAVs autonomous aerial refueling platform," Science China, Information Sciences, 2016, vol. 59, 7 pages. DOI:10.1007/s11432-016-5553-5.

Mammarella M. et al., "Machine Vision/GPS Integration Using EKF for the UAV Aerial Refueling Problem," IEEE Transactions on Systems, Man, and Cybernetics: Part C: Applications and Reviews, IEEE Service Center, Piscataway, NJ, US, vol. 38, No. 6, Nov. 30, 2008.

Sun Siyang et al., "Robust Visual Detection and Tracking Strategies for Autonomous Aerial Refueling of UAVs," IEEE Transactions on Instrumentation and Measurement, USA, vol. 68, No. 12, Dec. 31, 2019.

Sharma Sumant et al., "Neural Network-Based Pose Estimation for Noncooperative Spacecraft Rendezvous," IEEE Transactions on Aerospace and Electronic Systems, IEEE Service Center, Piscataway, NJ, US, vol. 5, No. 6, Jun. 2, 2020.

Mai, W. et al., "Feature-aided Bundle Adjustment Learning Framework for Self-supervised Monocular Visual Odometry," IEEE/RSJ International Conference on Intelligent Robots and Systems (IROS), Sep. 27-Oct. 1, 2021, pp. 9160-9167.

Mildenhall, B. et al., "NeRF: Representing Scenes as Neural Radiance Fields for View Synthesis," Communications of the ACM, Dec. 17, 2021, 65(1); pp. 99-106. https://doi.org/10.1145/3503250.

Lynch, J. C., "Monocular Pose Estimation for Automated Aerial Refueling via Perspective-n-Point," Air Force Institute of Technology, Theses and Dissertations, 2022, pp. 1-76. https://scholar.afit.edu/etd/6910.

Extended European Search Report, Application No. 24165111.6, dated Jul. 10, 2024. 8 pages.

\* cited by examiner

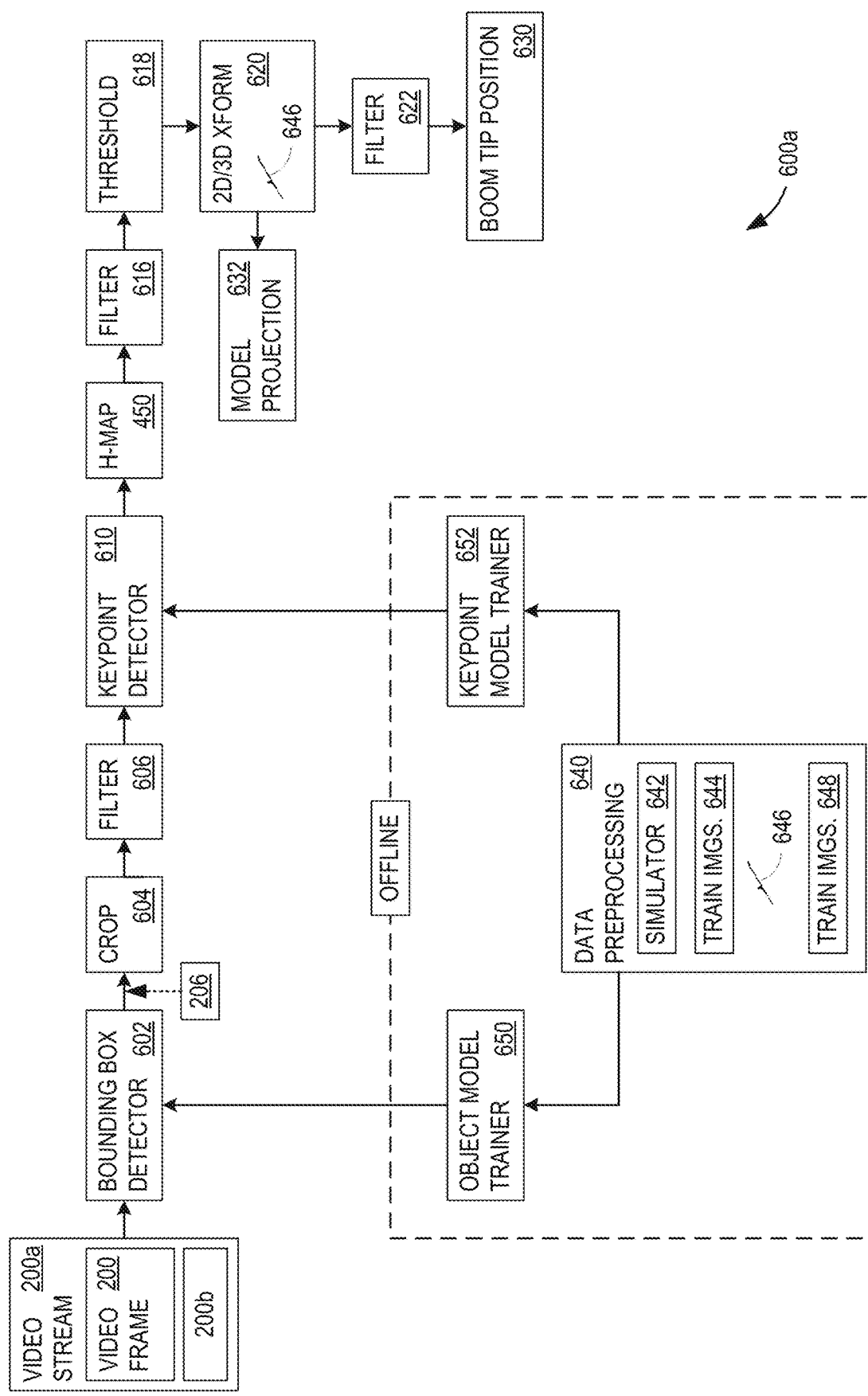

FUEL RECEPTACLE AND BOOM TIP POSITION AND POSE ESTIMATION FOR AERIAL REFUELING

CROSS-REFERENCE TO RELATED APPLICATION

This application claims the benefit of and priority to U.S. Provisional Application No. 63/134,085, entitled "FUEL RECEPTACLE AND BOOM TIP POSITION AND POSE ESTIMATION FOR AERIAL REFUELING", filed Jan. 5, 2021, which is incorporated by reference herein in its entirety.

BACKGROUND

Aerial refueling (air-to-air refueling) is typically performed manually, by a highly-skilled human refueling boom operator. Some arrangements place the human operator behind a window, with a view of the refueling boom and the aircraft to be refueled. This type of arrangement requires the added significant expense of providing accommodation for the human operator in the rear of the refueling platform.

Some arrangements use stereoscopic vision with dual cameras, in which the human operator wears goggles that provide a three-dimensional (3D) view based on the views from the dual cameras. Some other arrangements use light detection and ranging (LIDAR) or radar to provide supplemental range measurements for the human operator. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples provided herein include solutions for fuel receptacle and boom tip position and pose estimation for aerial refueling that include: receiving a video frame; determining, within the video frame, aircraft keypoints for an aircraft to be refueled; based on at least the aircraft keypoints, determining a position and pose of a fuel receptacle on the aircraft; determining, within the video frame, a boom tip keypoint for a boom tip of an aerial refueling boom; based on at least the boom tip keypoint, determining a position and pose of the boom tip; and based on at least the position and pose of the fuel receptacle and the position and pose of the boom tip, controlling the aerial refueling boom to engage the fuel receptacle. Some examples use only a single camera (monocular vision) for video input. Some examples overlay projections of an aircraft model on displayed video for a human operator or observer. Some examples enable automated aerial refueling, such as aerial refueling without requiring a highly-skilled human refueling boom operator.

BRIEF DESCRIPTION OF THE DRAWINGS

The disclosed examples are described in detail below with reference to the accompanying drawing figures listed below:

FIG. 6A illustrates a block diagram of a boom tip position and pose estimation pipeline 600a, in accordance with an example.

Corresponding reference characters indicate corresponding parts throughout the drawings in accordance with an example.

DETAILED DESCRIPTION

Figure 1A:
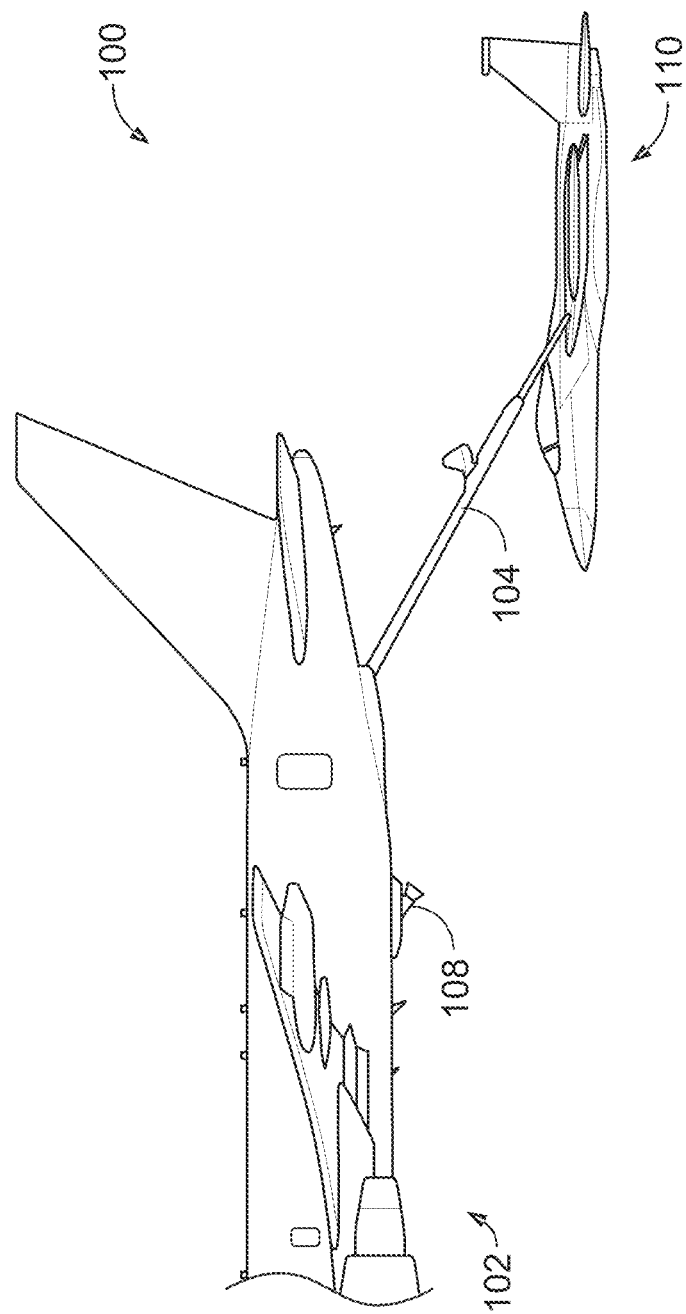
FIG. 1A illustrates an arrangement 100 that employs fuel receptacle and boom tip position and pose estimation for aerial refueling, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects and implementations disclosed herein are directed to fuel receptacle and boom tip position and pose estimation for aerial refueling that include: receiving a video frame; determining, within the video frame, aircraft keypoints for an aircraft to be refueled; based on at least the aircraft keypoints, determining a position and pose of a fuel receptacle on the aircraft; determining, within the video frame, a boom tip keypoint for a boom tip of an aerial refueling boom; based on at least the boom tip keypoint, determining a position and pose of the boom tip; and based on at least the position and pose of the fuel receptacle and the position and pose of the boom tip, controlling the aerial refueling boom to engage the fuel receptacle. Some examples use only a single camera (monocular vision) for video input. Some examples overlay projections of an aircraft model on displayed video for a human operator or observer. Some examples enable automated aerial refueling, such as aerial refueling without requiring a highly-skilled human refueling boom operator.

Aspects of the disclosure have a technical effect of improved operation of a computer, for example by reducing distance calculations, improving the efficiency of computational hardware, and provide better allocation of resources, as compared to traditional systems that rely on, for example processing many different measurement inputs. Aspects of the disclosure are able to estimate the position and orientation of a three-dimensional object (e.g., an aircraft fuel receptacle) in a video stream collected by a single camera, such as in support of autonomous aerial refueling operations and/or human-assisted aerial refueling operations. For example, aspects of the disclosure locate the relative positions and orientations (poses) of an aircraft fuel receptacle and a refueling platform's refueling boom in order to automate control of the refueling boom during refueling. In some examples, position and pose information is represented as six degrees-of-freedom (6DoF) including the three-dimensional (3D) position (x, y, and z coordinates) and orientation (roll, pitch, and yaw).

The location occurs in stages, such as object bounding box detection in the input two-dimensional (2D) video frames, 2D keypoint (object landmark) detection, and a 2D to 3D transform that determines the 6DoF information for each of the fuel receptacle and a tip of the refueling boom. Multi-stage pose estimation pipelines use real-time deep learning-based detection algorithms, for example, a neural network (NN) such as a deep convolutional neural network (CNN), which may be a residual neural network (ResNet). This provides accurate detection and tracking under adverse weather and lighting conditions which can be used for autonomous aerial (air-to-air) refueling, and/or an operator feedback loop. The use of a single camera can reduce component failures and be more easily integrated into existing systems.

Referring more particularly to the drawings, FIG. 1A illustrates an arrangement 100 that includes a refueling platform 102 and an aircraft 110 to be refueled. Each of refueling platform 102 and aircraft 110 may be an example of a flying apparatus 1101, described in further retail in relation to FIGS. 11 and 12. In the arrangement 100, the refueling platform 102 uses an aerial refueling boom 104 to refuel the aircraft 110. A camera 108 provides a video stream 200a (shown in FIG. 1B) for use in fuel receptacle and boom tip position and pose estimation.

Figure 1B:
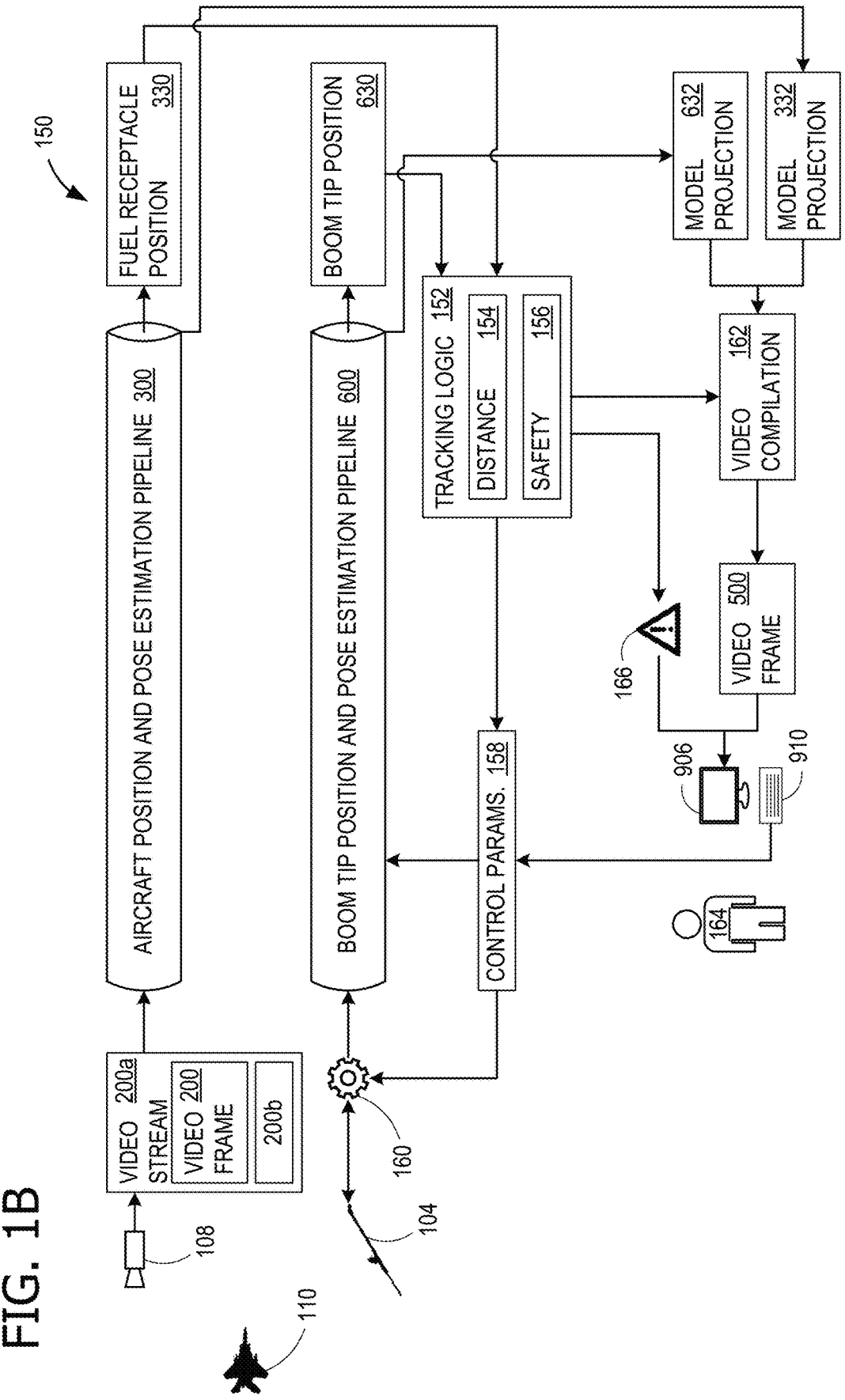
FIG. 1B illustrates a block diagram of a computer vision (CV) architecture 150 that can be used in the arrangement 100, in accordance with an example.

FIG. 1B illustrates a block diagram of a computer vision (CV) architecture 150 that performs fuel receptacle and boom tip position and pose estimation for the arrangement 100. The components of the architecture 150 are identified in FIG. 1B, with example data and further detail shown in FIGS. 2A-6B, and the operation of architecture 150 is described in further detail in relation to FIG. 7 (showing a flowchart 700). The architecture 150 receives a video stream 200a comprising a video frame 200 and a plurality of additional video frames 200b. An example video frame 200 is shown in a clean form in FIG. 2A and in an annotated form in FIG. 2B. The processing of the video frame 200 will be described. Processing of each of the plurality of additional video frames 200b is similar to that for the video frame 200.

The architecture 150 includes an aircraft position and pose estimation pipeline 300 and a boom tip position and pose estimation pipeline 600. The aircraft position and pose estimation pipeline 300 is shown and described in further detail in relation to FIG. 3. In some examples, the boom tip position and pose estimation pipeline 600 is implemented as a boom tip position and pose estimation pipeline 600a, which is shown and described in further detail in relation to FIG. 6A. In some examples, the boom tip position and pose estimation pipeline 600 is alternatively implemented as a boom tip position and pose estimation pipeline 600b, which is shown and described in further detail in relation to FIG. 6B.

The aircraft position and pose estimation pipeline 300 outputs a fuel receptacle position 330 (a position and pose of a fuel receptacle on the aircraft), for example, in 6DoF. In some examples, the aircraft position and pose estimation pipeline 300 also outputs an aircraft model projection 332. The boom tip position and pose estimation pipeline 600 outputs a boom tip position 630 (a position and pose of a boom). In some examples, the boom tip position and pose estimation pipeline 600 also outputs a boom model projection 632. The fuel receptacle position 330 and the boom tip position 630 are provided to a tracking logic 152 that determines a distance 154 between a boom tip 106 and a fuel receptacle 116, which are both shown in FIG. 2B. The tracking logic 152 determines boom control parameters 158, which are provided to a boom control 160 that autonomously moves the aerial refueling boom 104 to position the boom tip 106 to engage the fuel receptacle 116. That is, boom control 160 controls the aerial refueling boom 160 to engage the fuel receptacle 116. In some examples, the tracking logic 152 also determines whether controlling the aerial refueling boom 104 to engage the fuel receptacle 116 is within safety parameters 156, and if not, generates an alert 166.

Boom control parameters 158, as used herein include variables that describe how the boom 104 can move (e.g., roll, pitch, yaw, translate, telescope, extend, retract, pivot, rotate, and the like) and may include limits and rates of such movement. Boom control parameters 158 may control the boom 104 given constraints of the boom pivot position and camera intrinsic and extrinsic parameters, for example, how to rotate the boom (104 roll and pitch) and telescopically extend the boom 104 so that the 3D position of the boom tip 106 will be projected onto the camera image 200 where the boom tip keypoint 452 is detected.

Figure 5:
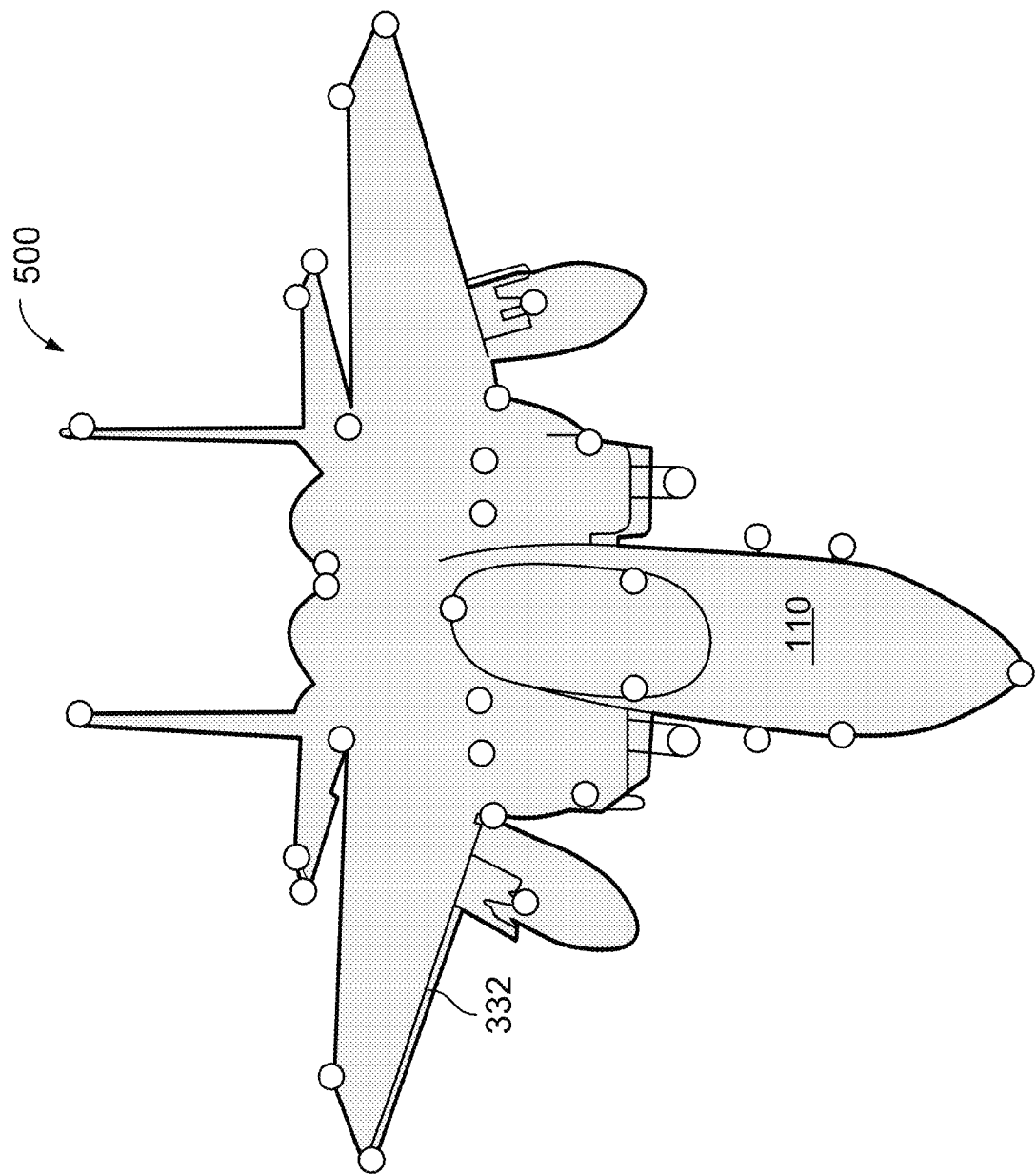
FIG. 5 illustrates a video frame 500, in which an aircraft model projection 332 is overlaid onto the video frame 200, in accordance with an example.

In some examples, the aircraft model projection 332 and/or the boom model projection 632 are provided to a video compilation 162 that overlays the aircraft model projection 332 and/or the boom model projection 632 onto the video frame 200 to produce an overlaid video frame 500. An example video frame 500 is shown in FIG. 5. In some examples, the video frame 500 and/or the alert 166 are provided to a human operator 164 over presentation components 906 (e.g., by displaying the video frame 500 on a video monitor screen). In some examples, the human operator 164 uses input/output (I/O) components 910 (e.g., a joystick, mouse, keyboard, touchscreen, keypad, and/or other input devices) to provide boom control parameters 158 to control the aerial refueling boom 104 to position the boom tip 106 to engage the fuel receptacle 116.

Figure 2A:
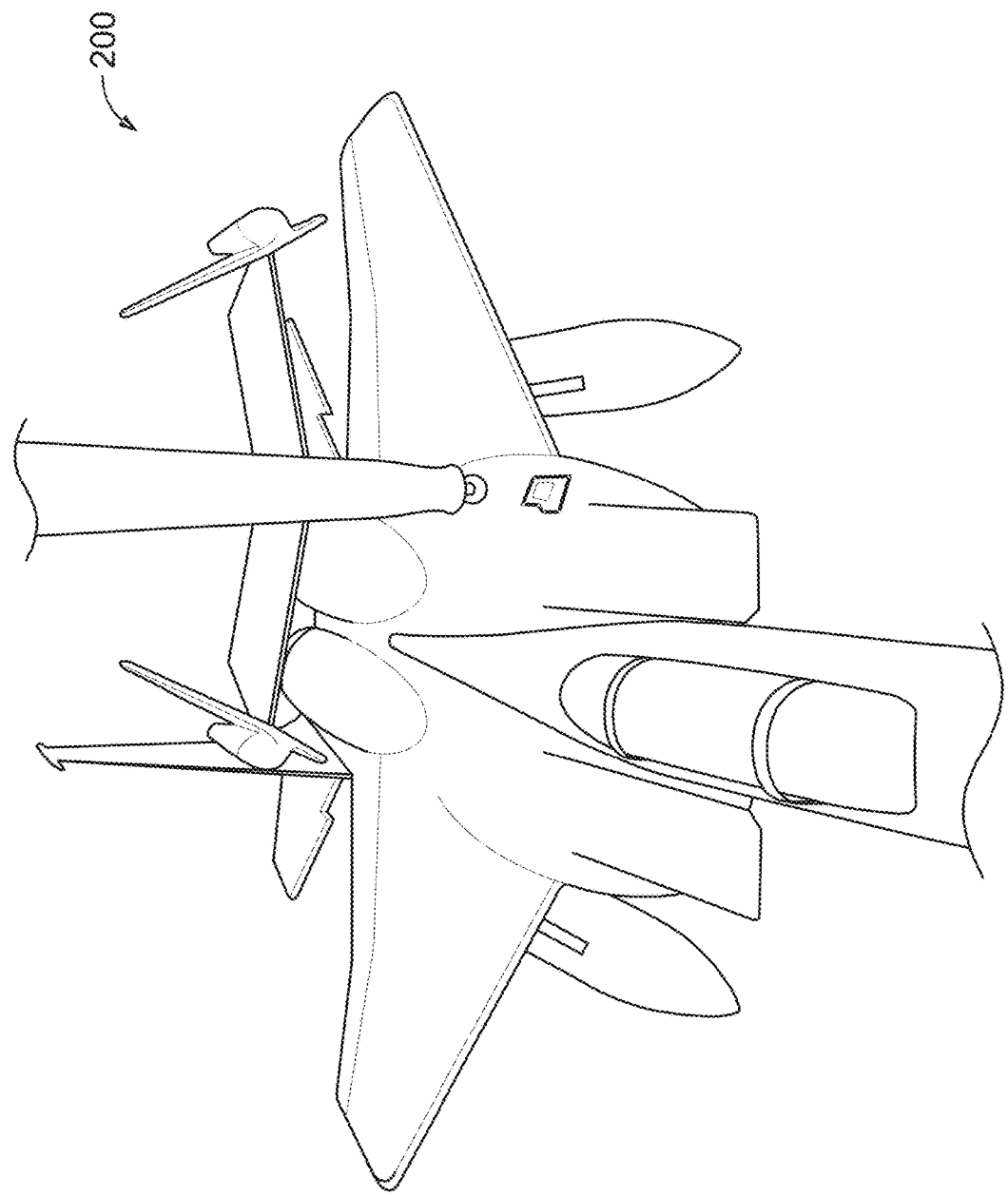
FIG. 2A shows a representative video frame 200 from an aerial refueling operation, in accordance with an example.
Figure 2B:
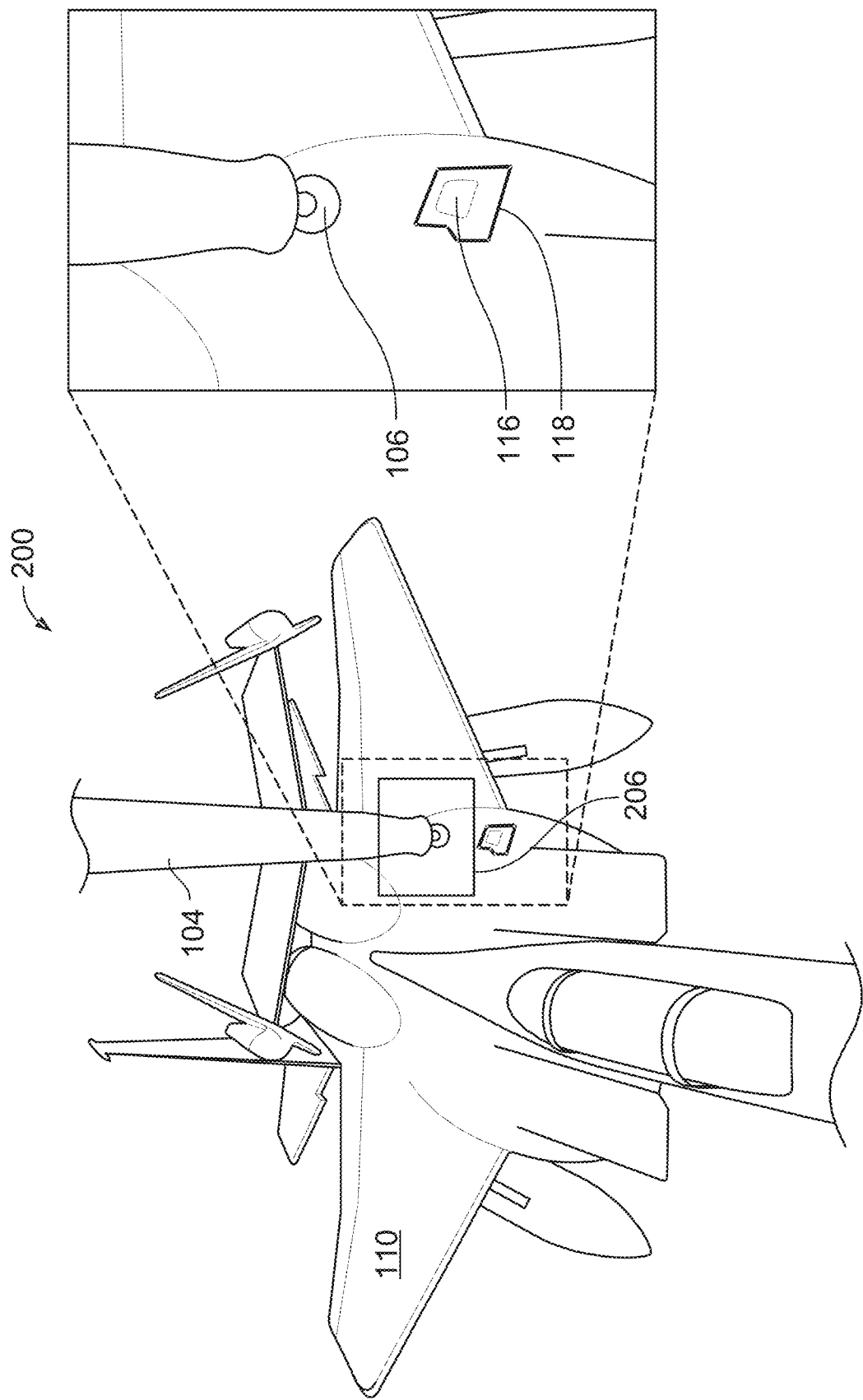
FIG. 2B shows an annotated version of the video frame 200.

FIG. 2A shows the representative video frame 200 from an aerial refueling operation. For clarity, FIG. 2A shows only a clean version of the video frame 200. FIG. 2B shows an annotated version of the video frame 200. The video frame 200 shows the aircraft 110 outlined with an aircraft bounding box 210. The aircraft bounding box 210 is generated by an early stage of an aircraft position and pose estimation pipeline 300, as described below for FIG. 3. The aircraft 110 has a fuel receptacle 116, which is outlined by a fiducial marker 118. The video frame 200 also shows the aerial refueling boom 104, with a boom tip 106, outlined with a boom tip bounding box 206. The boom tip bounding box 206 is generated by an early stage of a boom tip position and pose estimation pipeline 600, as described below for FIG. 6. In operation, the aerial refueling boom 104 delivers fuel to the aircraft 110 by the boom tip 106 engaging the fuel receptacle 116. The fiducial marker 118 facilitates location of the fuel receptacle 116 on the aircraft 110.

Figure 3:
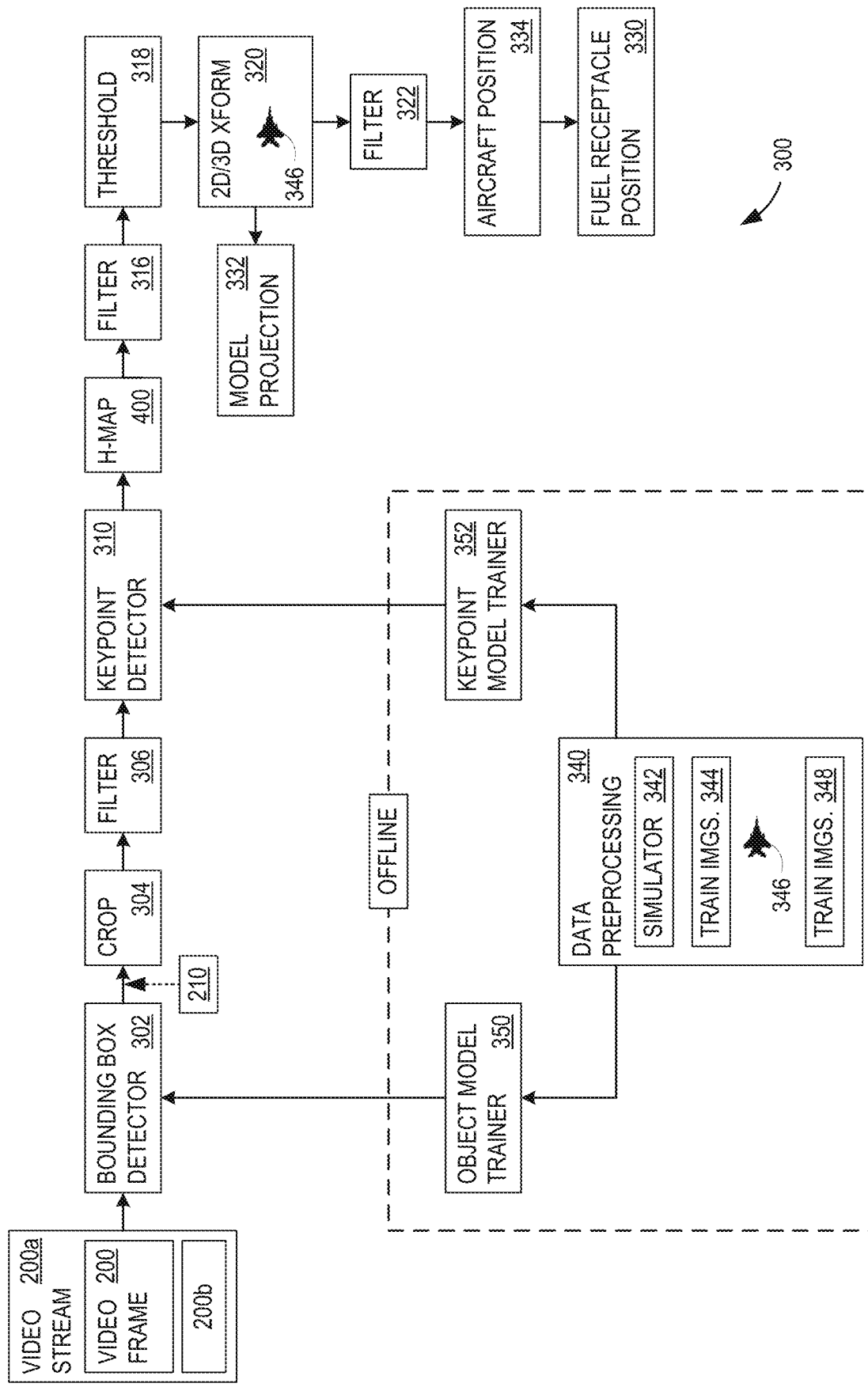
FIG. 3 illustrates a block diagram of an aircraft position and pose estimation pipeline 300, in accordance with an example.

FIG. 3 illustrates a block diagram of the aircraft position and pose estimation pipeline 300, which comprises a portion of the architecture 150. The video frame 200 is provided to an aircraft bounding box detector 302 that determines the aircraft bounding box 210. In some examples, the aircraft bounding box detector 302 crops the video frame 200 to the area corresponding to the aircraft bounding box 210, to produce a cropped image 304. With cropping, later stages may neglect unnecessary sections of the video frame 200 by taking only the contents of the enclosing rectangle as input. Using just the area of interest also helps decrease computational time and allows use of more computationally intensive algorithms in later stages of the pipeline.

In some examples, a filter 306 filters the video data, for example using a Kalman filter. Kalman filtering uses a series of measurements observed over time, containing statistical noise and other inaccuracies, and produces estimates of unknown variables that tend to be more accurate than those based on a single measurement alone, by estimating a joint probability distribution over the variables for each time-frame. Thus, in some examples, the filter 306 operates across video frames (e.g., the video frame 200 and the plurality of additional video frames 200b).

In some examples, the aircraft bounding box detector 302 comprises an NN, for example a deep CNN. The aircraft bounding box detector 302 is trained using an object model trainer 350, as described below. The output of the aircraft bounding box detector 302 (cropped and/or filtered, in some examples), is provided to an aircraft keypoint detector 310. In some examples, the aircraft keypoint detector 310 comprises an NN, for example ResNet. The aircraft keypoint detector 310 is trained using a keypoint model trainer 352, as described below, and outputs an aircraft keypoint heatmap 400. Keypoint detection identifies the locations in video frames of points on a 3D object which may be used for 6DOF pose estimation. Keypoints can be chosen as consistently recognizable locations on the 3D object such as wingtips on an aircraft. A heatmap is a graphical representation of data that uses a system of color-coding to represent different values. Heatmap pixel values indicate, for each keypoint, the likelihood of a 3D object's keypoint being found at each pixel location of the image.

Figure 4B:
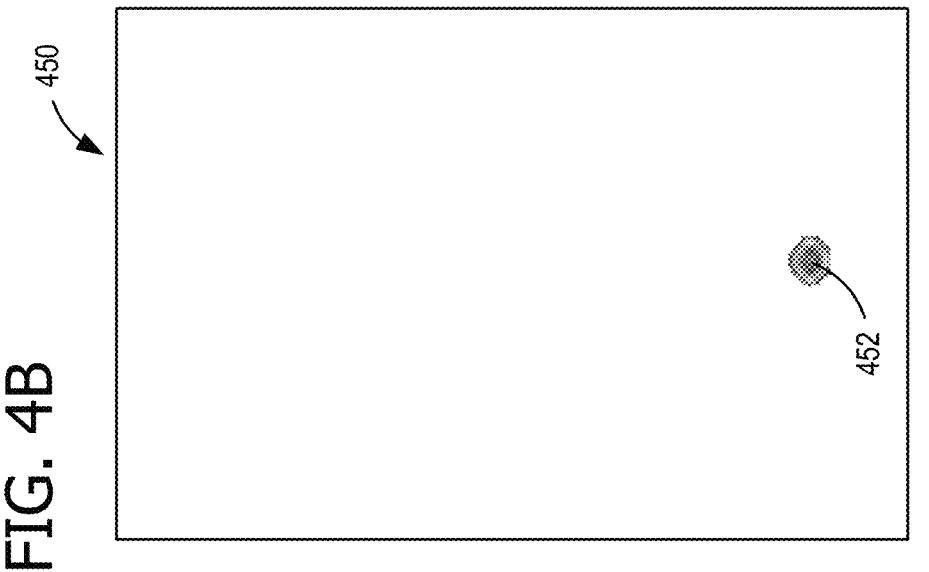
FIG. 4B shows a representative boom tip keypoint heatmap 450 for a boom tip 106, in accordance with an example.
Figure 4A:
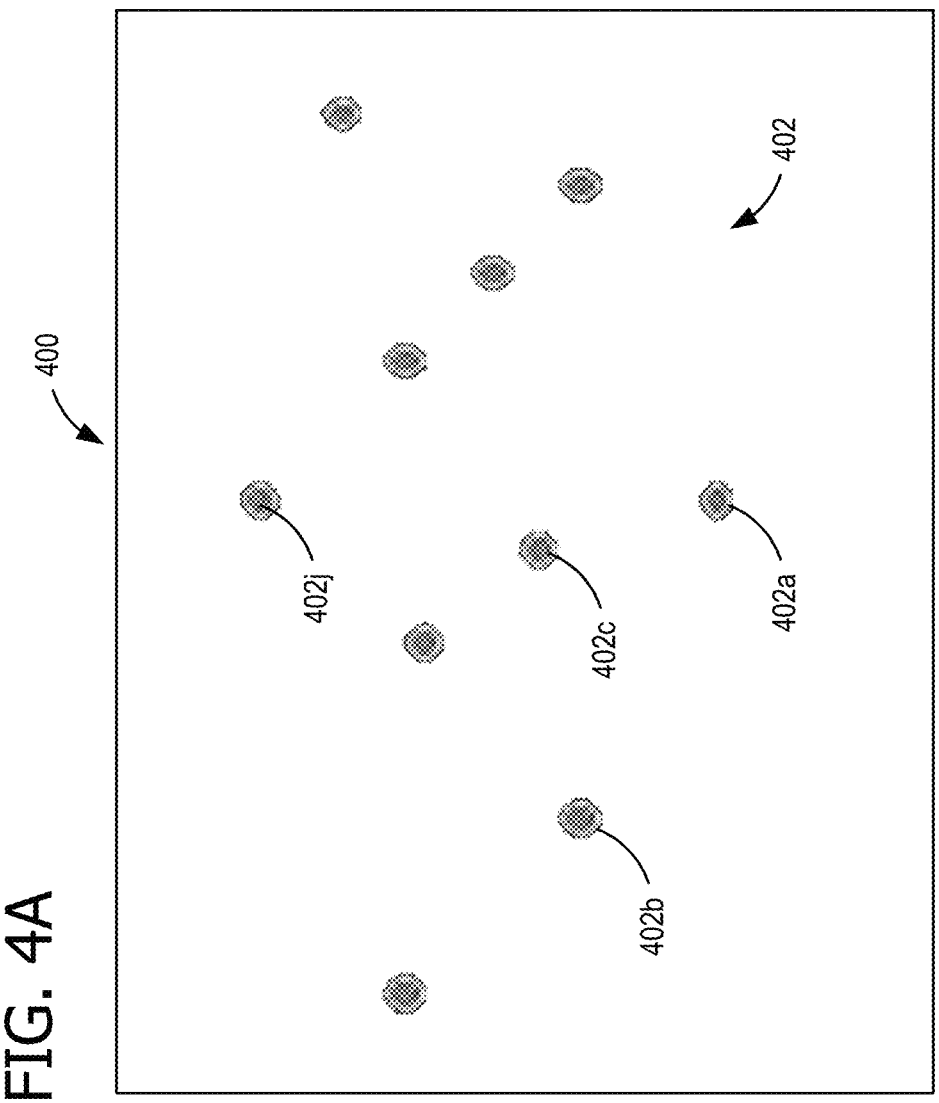
FIG. 4A shows a representative aircraft keypoint heatmap 400 for an aircraft 110, in accordance with an example.

The aircraft keypoint heatmap 400 is described in further detail in relation to FIG. 4A. In some examples, the aircraft keypoint heatmap 400 is filtered with a filter 316 which, in some examples, comprises a Kalman filter (and thus filters heatmaps across video frames). In some examples, a threshold 318 is applied to eliminate keypoints having a low confidence level.

The aircraft keypoint heatmap 400 (filtered and thresholded, in some examples) is provided to an aircraft 2D to 3D transform 320. In some examples, the aircraft 2D to 3D transform 320 uses a perspective-n-point (PnP) algorithm. PnP algorithms estimate the pose of a calibrated camera relative to an object, given a set of N 3D points on the object and their corresponding 2D projections in an image collected by the camera. The PnP algorithm used leverages the correspondences between the 2D pixel locations of detected keypoints and 3D keypoint locations on an object model to rotate and position the object in space such that the camera's view of the 3D keypoints matches the 2D pixel locations.

The aircraft 2D to 3D transform 320 determines an aircraft position 334 (a position and pose of the aircraft 110) and, from that, the fuel receptacle position 330. That is, once the aircraft position 334 is known, the fuel receptacle position 330, which is in a predetermined location on the aircraft 110, can be determined. In some examples, the aircraft position 334 and/or the fuel receptacle position 330 is filtered with a filter 322. In some examples, the filter 322 also comprises a Kalman filter (which filters in time across video frames). In some examples, the aircraft 2D to 3D transform 320 also generates the aircraft model projection 332. The aircraft model projection 332 is determined by rendering a 3D aircraft model 346 according to the aircraft position 334.

The aircraft bounding box detector 302 and the aircraft keypoint detector 310 are both initially trained offline, although some examples may employ on-going training during deployment. A data pre-processing component 340 uses a simulator 342 to generate training images 344 for the object model trainer 350, using the 3D aircraft model 346. In some examples, the 3D aircraft model 346 comprises a computer-aided design (CAD) model. In some examples, the training images 344 include approximately 20,000 labeled training images, generated by sweeping across ranges of 6DoF variations for the 3D aircraft model 346. To increase variations in the datasets used for NN training, data augmentations are randomly applied to each image passed to the NN. These augmentations include: brightness scaling, contrast scaling, image size scaling, and image translation, among others.

The data pre-processing component 340 is able to label the training images 344 because the simulator 342 has the ground truth data when generating the training imagery. The object model trainer 350 trains the aircraft bounding box detector 302 using the training images 344. Training of the aircraft keypoint detector 310 is similar. The simulator 342 sweeps through 6DoF variations to produce the necessary count of training images 348. The keypoint model trainer 352 trains the aircraft keypoint detector 310 using the training images 348. The pixel values of ground truth heatmaps are assigned the values of a Gaussian probability distribution over 2D coordinates with a mean equal to the ground truth 2D pixel location and covariance left as a hyperparameter for training. The loss that is minimized during training is the pixel-wise mean-squared-error between the neural network's heatmap outputs and the ground truth heatmaps.

FIG. 4A shows the aircraft keypoint heatmap 400 for the aircraft 110. The aircraft keypoint heatmap 400 has a set of aircraft keypoints 402, which include aircraft keypoint 402a, aircraft keypoint 402b, aircraft keypoint 402h, aircraft keypoint 402j, and other aircraft keypoints that are not labeled (for clarity). Aircraft keypoints 402 are identifiable locations in a two dimensional (2D) image that correspond to features of a three dimensional (3D) aircraft, such as wingtips, sharp corners, seams, the abutment of different features (e.g., the canopy with the fuselage), and even a fiducial marker (e.g., the fiducial marker 118). In some examples, there may be 33 keypoints for the aircraft 110. However, different numbers of keypoints can be used.

FIG. 4B shows the boom tip keypoint heatmap 450 for the boom tip 106. In some examples, the boom tip keypoint heatmap 450 has only a single keypoint 452. In some examples, the keypoints 402 and 452 for the aircraft keypoint heatmap 400 and the boom tip keypoint heatmap 450 are not represented as binary points, but rather as probabilistic distributions. In some examples, for the keypoints 402 and 452, the location of the pixel with the highest value is kept, which indicates the highest likelihood of containing the 3D object's keypoint. If that keypoint's value exceeds a tuned threshold, then the keypoint is considered detected.

That is, each of the keypoints 402 and 452 corresponds to a region of pixels, with the values of the pixels dropping according to a probability density function (pdf), with increasing distance from the center of the region. In some examples, the maximum value of a pixel, in a keypoint region of pixels, reflects a confidence level of that keypoint. Thus, the aircraft keypoint heatmap 400 and the boom tip keypoint heatmap 450 are able to not only convey the locations of the keypoints 402 and 452, but also indicate confidence values for the keypoints 402 and 452. However, in some examples, only the highest-valued pixel is retained in each region.

FIG. 5 illustrates a video frame 500, in which an aircraft model projection 332 is overlaid onto the video frame 200 for display to the human operator 164. The aircraft model projection 332 is generated using the 3D aircraft model 346, rendered according to the position and pose estimation from the aircraft position and pose estimation pipeline 300. For clarity, only the outline of the aircraft model projection 332 is shown. In some examples, a boom model projection 632 is overlaid onto the video frame 200 in addition to or instead of the aircraft model projection 332.

FIG. 6A illustrates a block diagram of a boom tip position and pose estimation pipeline 600a. In some examples, the boom tip position and pose estimation pipeline 600a is used as the operational boom tip position and pose estimation pipeline 600 of the architecture 150. The video frame 200 is provided to a boom tip bounding box detector 602 that determines the boom tip bounding box 206. In some examples, the boom tip bounding box detector 602 crops the video frame 200 to the area corresponding to the boom tip bounding box 206, to produce a cropped image 604. In some examples, a filter 606 filters the video data, for example using a Kalman filter operating across video frames (e.g., the video frame 200 and the plurality of additional video frames 200b).

In some examples, the boom tip bounding box detector 602 comprises an NN, for example a deep CNN. The boom tip bounding box detector 602 is trained using an object model trainer 650, as described below. The output of the boom tip bounding box detector 602 (cropped and/or filtered, in some examples), is provided to a boom tip keypoint detector 610. In some examples, the boom tip keypoint detector 610 comprises an NN, for example a ResNet. The boom tip keypoint detector 610 is trained using a keypoint model trainer 652, as described below, and outputs a boom tip keypoint heatmap 450. The boom tip keypoint heatmap 450 was described in relation to FIG. 4B. In some examples, the boom tip keypoint heatmap 450 is filtered with a filter 616 which, in some examples, comprises a Kalman filter (and thus filters heatmaps across video frames). In some examples, a threshold 618 is applied to eliminate keypoints having a low confidence level.

Figure 6B:
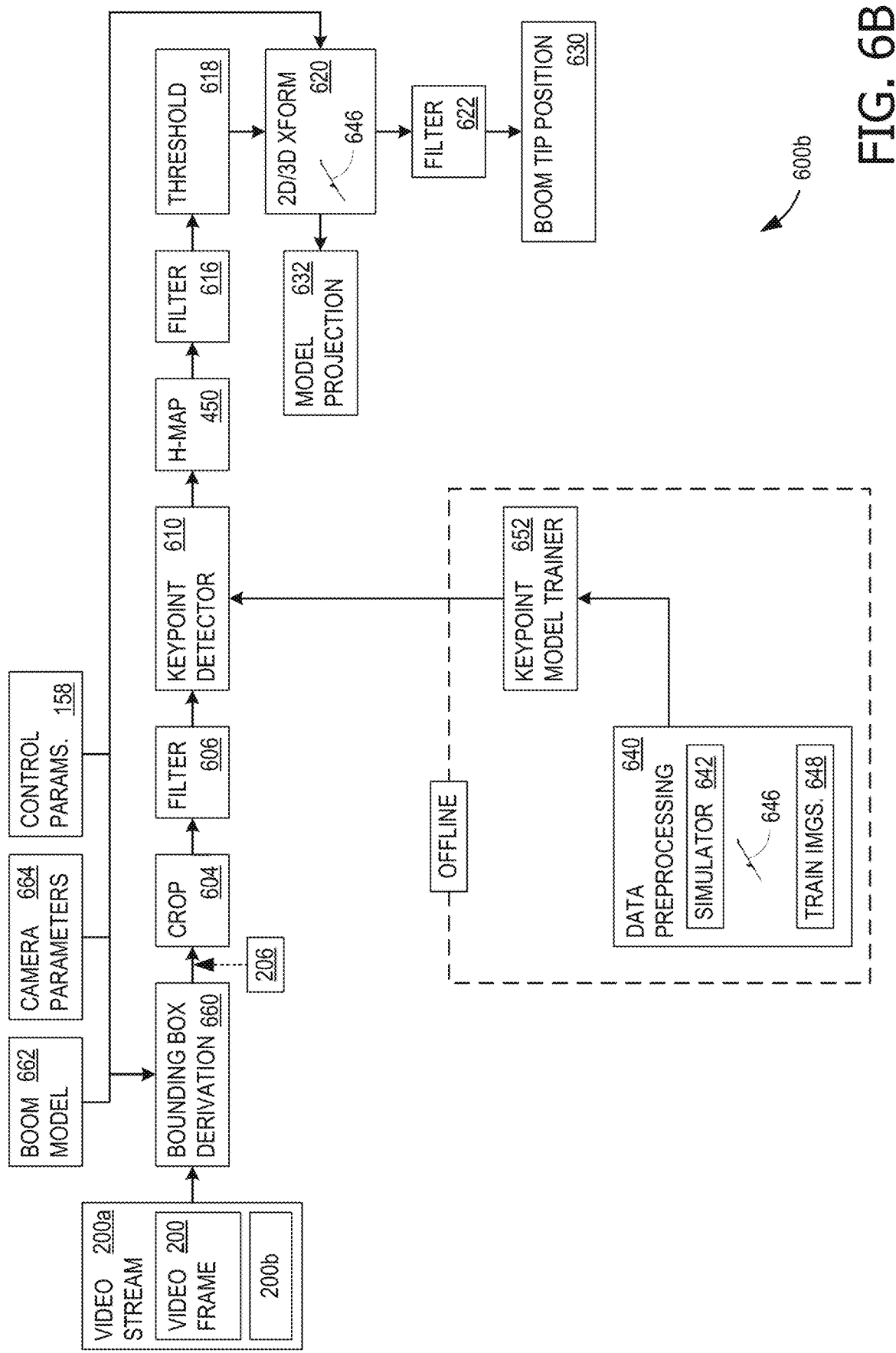
FIG. 6B illustrates a block diagram of an alternative boom tip position and pose estimation pipeline 600b, in accordance with an example.

The boom tip keypoint heatmap 450 (filtered and thresholded, in some examples) is provided to a boom tip 2D to 3D transform 620, which is described in further detail in relation to FIG. 6B. The boom tip 2D to 3D transform 620 determines the boom tip position 630 which, in some examples, is filtered with a filter 622. In some examples, the filter 622 also comprises a Kalman filter (which filters in time across video frames). In some examples, the boom tip 2D to 3D transform 620 also generates the boom model projection 632. The boom model projection 632 is determined by rendering a 3D refueling boom model 646 according to the boom tip position 630.

The boom tip bounding box detector 602 and the boom tip keypoint detector 610 are both initially trained offline, although some examples may employ on-going training during deployment. A data pre-processing component 640 uses a simulator 642 to generate training images 644 for the object model trainer 650, using the 3D refueling boom model 646. In some examples, the 3D refueling boom model 646 comprises a computer-aided design (CAD) model. In some examples, the training images 644 includes approximately 20,000 labeled training images, generated by sweeping across ranges of the boom control parameters for the 3D refueling boom model 646.

The data pre-processing component 640 is able to label the training images 644 because the simulator 642 has the ground truth data when generating the training imagery. The object model trainer 650 trains the boom tip bounding box detector 602 using the training images 644. Training of the boom tip keypoint detector 610 is similar. The simulator 642 sweeps through boom control parameter variations to produce the necessary count of training images 648. The keypoint model trainer 652 trains the boom tip keypoint detector 610 using the training images 648.

FIG. 6B illustrates a block diagram of a boom tip position and pose estimation pipeline 600b. In some examples, the boom tip position and pose estimation pipeline 600b is used as the operational boom tip position and pose estimation pipeline 600 of the architecture 150. The boom tip position and pose estimation pipeline 600b is similar to the boom tip position and pose estimation pipeline 600a, although a boom tip bounding box derivation 660 replaces the boom tip bounding box detector 602. The boom tip bounding box derivation 660 uses a boom model 646, camera parameters 664 (e.g., extrinsic and intrinsic parameters for the camera 108), and the boom control parameters 158 to calculate the position of the boom tip bounding box 206, rather than detecting it from imagery. The boom model 662, the camera parameters 664, and the boom control parameters 158 are also input to the boom tip 2D/3D transform 620.

This approach uses the known angles, extrinsics, and geometry of the aerial refueling boom 104 in relation to the camera 108 to determine a projection of the aerial refueling boom 104. By monitoring at each video frame the pitch and roll states of the boom control 160, the pitch and roll of the aerial refueling boom 104 in relation to the camera 108 is determinable at the time of each image (video frame)

capture. Since the intrinsics of the camera 250 and its position are known, the location of the aerial refueling boom 104 in the 2D pixel space of the camera 108 can be determined.

Camera parameter information includes the parameters used in a camera model to describe the mathematical relationship between the 3D coordinates of a point in the scene from which the light comes from and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

The boom tip 2D to 3D transform 620 uses the known angles, extrinsics, and geometry of an object at each time instance to capture its world position using a similar approach as described the boom tip bounding box derivation 660. However, rather than converting the location to a 2D pixel coordinate space, it is converted to a boom control parameter estimation.

Figure 7:
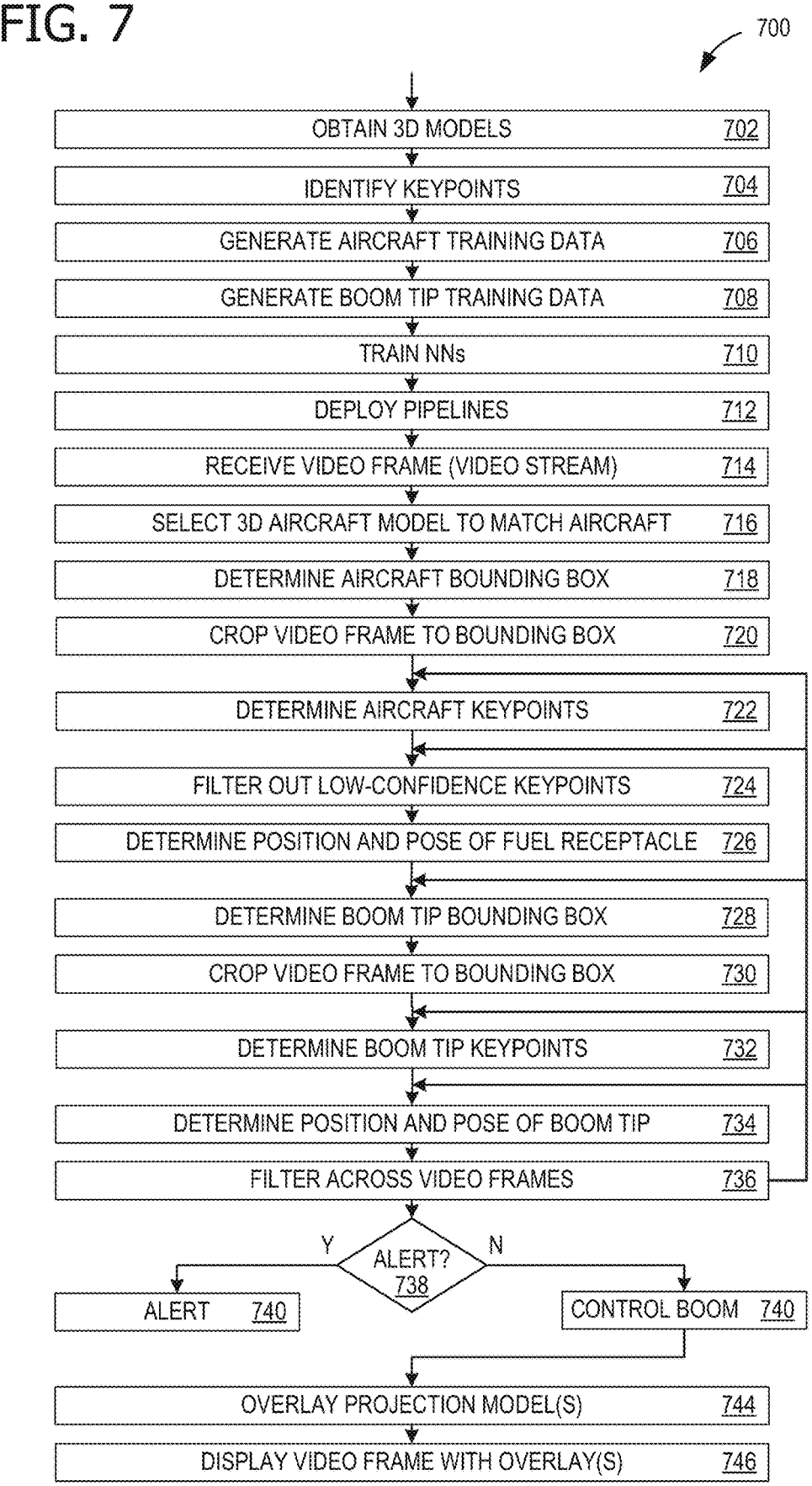
FIG. 7 is a flowchart 700 illustrating a method of fuel receptacle and boom tip position and pose estimation for aerial refueling, as can be used with the arrangement 100 of FIG. 1, in accordance with an example.

With reference now to FIG. 7, a flowchart 700 illustrates a method of fuel receptacle and boom tip position and pose estimation for aerial refueling. In some examples, the operations illustrated in FIG. 7 are performed, at least in part, by executing instructions 902a (stored in the memory 902) by the one or more processors 904 of the computing device 900 of FIG. 9. For example, any of the aircraft bounding box detector 302, the aircraft keypoint detector 310, the boom tip bounding box detector 602, and the boom tip keypoint detector 610, can be trained on a first example of the computing device 900 and then deployed on a second (different) example of the computing device 900.

Operations 702-710 are performed prior to deployment, to train the NNs. Operation 702 includes obtaining one or more 3D aircraft models (of aircraft types that are expected to be refueled) and a 3D boom model, for example the 3D aircraft model 346 and the 3D boom model 646. Operation 704 includes identifying points on the aircraft model that correspond to detectable keypoints in 2D images. Operation 706 includes generating the training images 344 for a first NN (e.g., within the aircraft bounding box detector 302) using the simulator 342 that sweeps the 3D aircraft model 346 through various 6DoF values to produce a set of aircraft images and aircraft ground truth data, and labeling the aircraft images using the aircraft ground. Operation 706 also includes generating the training images 348 for a second NN (e.g., within the aircraft keypoint detector 310) using aircraft training heatmaps that correspond to the set of aircraft images, the aircraft training heatmaps having keypoints based on the identified points on the aircraft model, and labeling the aircraft training heatmaps using the aircraft ground truth data.

Operation 708 includes generating the training images 644 for a third NN (e.g., within the boom tip bounding box detector 602) using the simulator 642 that sweeps the 3D boom model 646 through various boom control parameter values to produce a set of boom tip images and boom tip ground truth data, and labeling the boom tip images using the boom tip ground truth data. Operation 708 also includes generating the training images 648 for the fourth NN (e.g., within the boom tip keypoint detector 610) using boom tip training heatmaps that correspond to the set of boom tip images, the boom tip training heatmaps having a keypoint based on a location of the boom tip, and labeling the boom tip training heatmaps using the boom tip ground truth data. Operation 710 includes training the NNs using the training images 344, 348, 644, and 648.

The architecture 150, including the aircraft position and pose estimation pipeline 300 and the boom tip position and pose estimation pipeline 600 (600a or 600b) is deployed in operation 712. Operation 714 includes receiving the video frame 200. In some examples, the video frame 200 is provided by a single camera 108. In some examples, the video frame 200 is monocular. Some examples include receiving the video stream 200a comprising the video frame 200 and the plurality of additional video frames 200b. Operation 716 includes selecting a 3D aircraft model e.g., selecting the 3D aircraft model 346 from a library of 3D aircraft models), based on at least the aircraft 110 to be refueled.

Operation 718 includes determining, within the video frame 200, the aircraft bounding box 210 for the aircraft 110 to be refueled. In some examples, determining the aircraft bounding box 210 comprises determining the aircraft bounding box 210 using a first NN, the first NN comprising a CNN. Operation 720 includes cropping the video frame 200 to the aircraft bounding box 210. Operation 722 includes determining, within the (cropped) video frame 220, aircraft keypoints 402 for the aircraft 110 to be refueled. In some examples, determining the aircraft keypoints 402 comprises determining the aircraft keypoints 402 using a second NN, the second NN comprising a ResNet. In some examples, determining the aircraft keypoints 402 comprises determining the aircraft keypoints 402 within the aircraft bounding box 210. In some examples, determining the aircraft keypoints 402 comprises generating the aircraft keypoint heatmap 400 of the aircraft keypoints 402. In some examples, generating the aircraft keypoint heatmap 400 comprises determining a confidence value for each aircraft keypoint.

Operation 724 includes filtering out aircraft keypoints 402 in the aircraft keypoint heatmap 400 having confidence values below a threshold. Operation 726 includes, based on at least the aircraft keypoints 402, determining a position and pose of the fuel receptacle 116 (e.g., the fuel receptacle position 330) on the aircraft 110. In some examples, the position and pose of the fuel receptacle represent 6DOF. In some examples, determining the position and pose of the fuel receptacle comprises performing the 2D to 3D transform 320 for the aircraft keypoints 402. In some examples, the 2D to 3D transform 320 for the aircraft keypoints 402 uses a PnP algorithm. In some examples, determining the position and pose of the fuel receptacle 116 comprises determining a position and pose of the aircraft 110 (e.g., the aircraft position 334). In some examples, determining the position and pose of the fuel receptacle 116 comprises identifying aircraft keypoints associated with the fiducial marker 118.

Operation 728 includes determining, within the video frame 200, a boom tip bounding box 206 for the boom tip 106. In some examples, determining the boom tip bounding box 206 comprises determining the boom tip bounding box 206 using a third NN (e.g., within the boom tip bounding box detector 602), the third NN comprising a CNN. In some examples, determining the boom tip bounding box 206 comprises determining the boom tip bounding box 206 for the boom tip 106 using the boom control parameters 158 and the camera parameters 664 (e.g., camera calibration information). Operation 730 includes cropping the video frame 200 to the boom tip bounding box 206.

Operation 732 includes determining, within the (cropped) video frame 200, the boom tip keypoint 452 for the boom tip 106 of the aerial refueling boom 104. In some examples, determining the boom tip keypoint 452 comprises determining the boom tip keypoint 452 using a fourth NN (e.g., within the boom tip keypoint detector 610), the fourth NN comprising a ResNet. In some examples, determining the boom tip keypoint 452 comprises determining the boom tip keypoint 452 within the boom tip bounding box 206. In some examples, determining the boom tip keypoint 452 comprises generating the boom tip keypoint heatmap 450 of the boom tip keypoint 452. In some examples, generating the boom tip keypoint heatmap 450 comprises determining a confidence value for the boom tip keypoint 452. Operation 734 includes, based on at least the boom tip keypoint 452, determining a position and pose of the boom tip 106 (the boom tip position 630). In some examples, the position and pose of the boom tip 106 represent 6DOF. In some examples, determining the position and pose of the boom tip 106 comprises performing the 2D to 3D transform 620 for the boom tip keypoint 452. In some examples, position and pose of boom tip 106 may be determined using the boom control parameters, foregoing the need of doing boom tip keypoint detection. In such examples, operations 728-732 are not performed, and operation 734 includes determining a position and pose of the boom tip 106 of the aerial refueling boom 104.

Operation 736 includes filtering at least one of the aircraft bounding box 210, the aircraft keypoint heatmap 400, the position and pose of the aircraft 110, the position and pose of the fuel receptacle 116, the boom tip bounding box 206, the boom tip keypoint heatmap 450, or the position and pose of the boom tip 106 with a Kalman filter. Each stage takes as input, the tracked version of the previous stage's output. The filters each track a point in multidimensional space with velocity. Each filters' observation covariance matrix is a diagonal matrix with one identical variance for the multidimensional vector's values and one order of magnitude smaller identical variance for the vector velocity. The filters' transition matrices add the tracked velocities to their respective vectors. For the bounding box detectors 302 and 602, the box center 2D position, aspect ratio, and height are tracked as a 4D vector with velocity. The keypoint detectors 310 and 610 use a separate filter for each keypoint, which tracks a 2D coordinate. The 2D to 3D transform 320 and output filter 322 tracks the translation and Rodrigues rotation vector results of the PnP algorithm, concatenated as a six-dimensional (6D) vector. The 2D to 3D transform 620 estimates the boom tip 2D keypoint, solving for the boom control parameters given constraints of the boom pivot position and camera intrinsic and extrinsic parameters, for example, how to rotate the boom (roll and pitch) and extend the boom telescope so that the 3D position of the boom tip will be projected onto the camera image 200 where the boom tip keypoint is detected.

A decision operation 738 includes, based on at least the position and pose of the fuel receptacle 116 and the position and pose of the boom tip 106, determining whether controlling the aerial refueling boom 104 to engage the fuel receptacle 116 is within the safety parameters 156. In some examples, the safety parameters 156 include a range of safe angles and stable relative positions. If an alert is warranted, operation 740 includes, based on at least determining that controlling the aerial refueling boom 104 to engage the fuel receptacle 116 is not within the safety parameters 156, generating the alert 166 and displaying the alert 166 to the human operator 164.

Otherwise, operation 742 includes, based on at least the position and pose of the fuel receptacle 116 and the position and pose of the boom tip 106, controlling the aerial refueling boom 104 to engage the fuel receptacle 116. In some examples, controlling the aerial refueling boom 104 to engage the fuel receptacle 116 comprises tracking the distance 154 between the boom tip 106 and the fuel receptacle 116. In some examples, controlling the aerial refueling boom 104 to engage the fuel receptacle 116 comprises determining the boom control parameters 158 to close the distance 154 between the boom tip and the fuel receptacle. In some examples, as part of operation 742, boom control 160 controls the aerial refueling boom 160 to engage the fuel receptacle 116.

Operation 744 includes based on at least the position and pose of the aircraft 110, overlaying the aircraft model projection 332 in the video frame 200. In some examples, operation 744 also or alternatively includes, based on at least the position and pose of the boom tip 106, overlaying the boom model projection 632 in the video frame 200. Either or both of these overlays generates the video frame 500. Operation 746 includes displaying the video frame 500 with the overlay of the aircraft model projection 332 and/or the overlay of the boom model projection 632 to the human operator 164.

Figure 8:
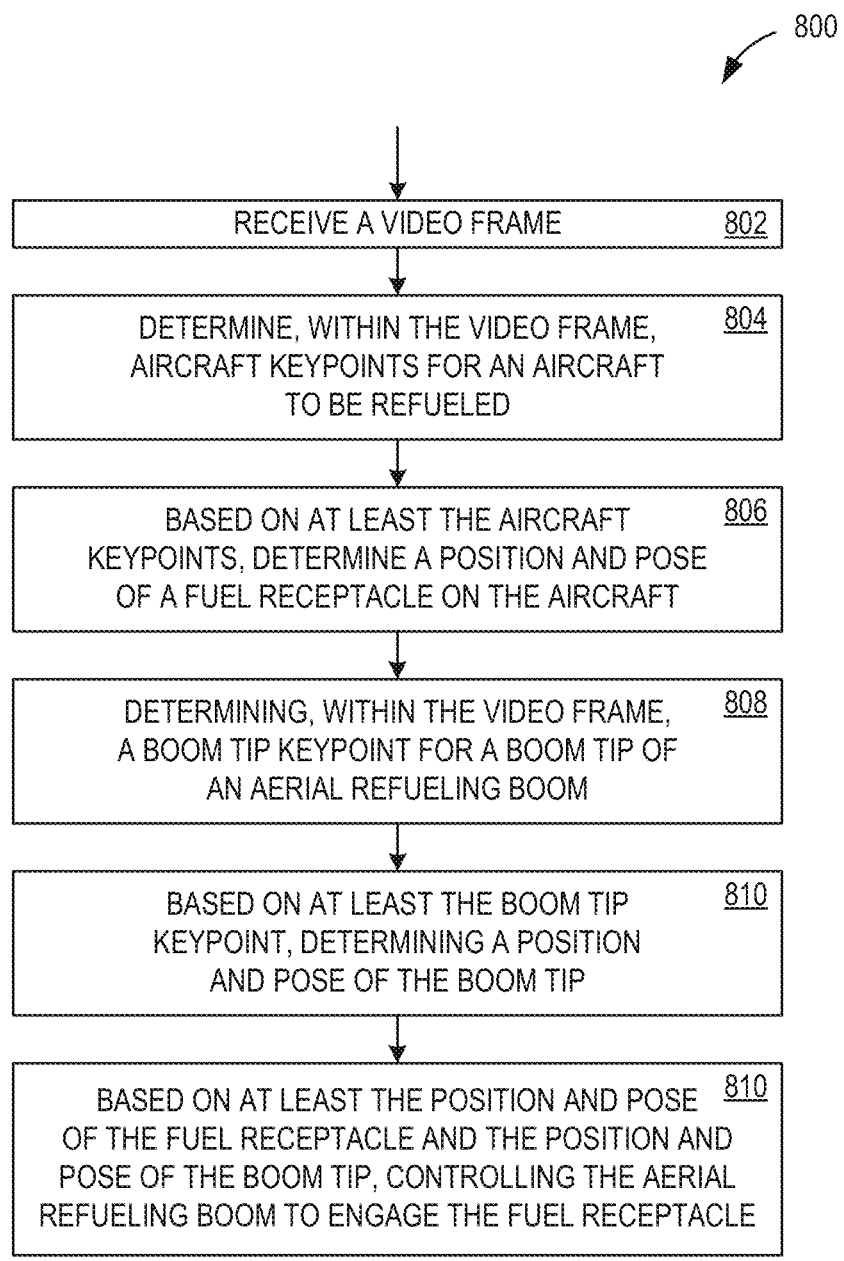
FIG. 8 is a flowchart 800 illustrating another method of fuel receptacle and boom tip position and pose estimation for aerial refueling, as can be used with the arrangement 100 of FIG. 1, in accordance with an example.

FIG. 8 shows a flowchart 800 illustrating a method of fuel receptacle and boom tip position and pose estimation for aerial refueling. In some examples, operations illustrated in FIG. 8 are performed, at least in part, by executing instructions by the one or more processors 904 of the computing device 900 of FIG. 9. Operation 802 includes receiving a video frame. Operation 804 includes determining, within the video frame, aircraft keypoints for an aircraft to be refueled. Operation 806 includes, based on at least the aircraft keypoints, determining a position and pose of a fuel receptacle on the aircraft. Operation 808 includes determining, within the video frame, a boom tip keypoint for a boom tip of an aerial refueling boom. Operation 810 includes, based on at least the boom tip keypoint, determining a position and pose of the boom tip. Operation 812 includes, based on at least the position and pose of the fuel receptacle and the position and pose of the boom tip, controlling the aerial refueling boom to engage the fuel receptacle.

Figure 9:
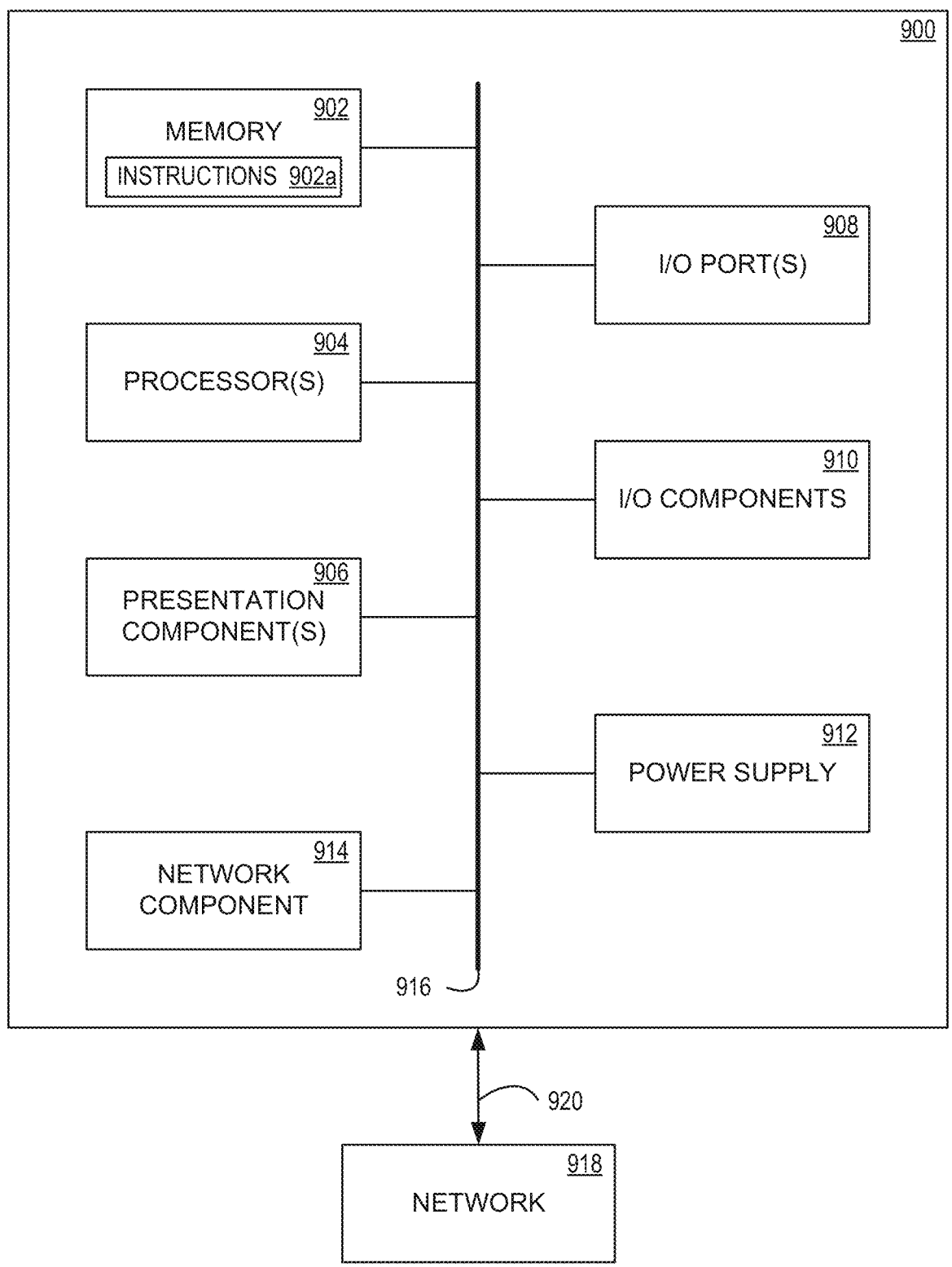
FIG. 9 is a block diagram of a computing device 900 suitable for implementing various aspects of the disclosure in accordance with an example.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902*a* configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flowcharts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Implementations of the I/O components 910 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some implementations blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
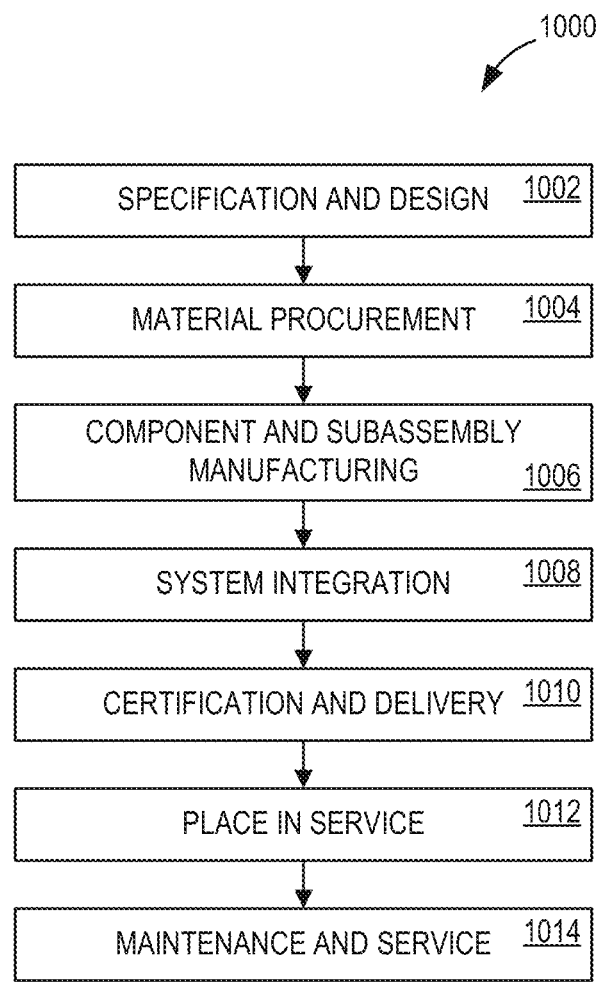
FIG. 10 is a block diagram of an apparatus production and service method 1000 that employs various aspects of the disclosure in accordance with an example.
Figure 11:
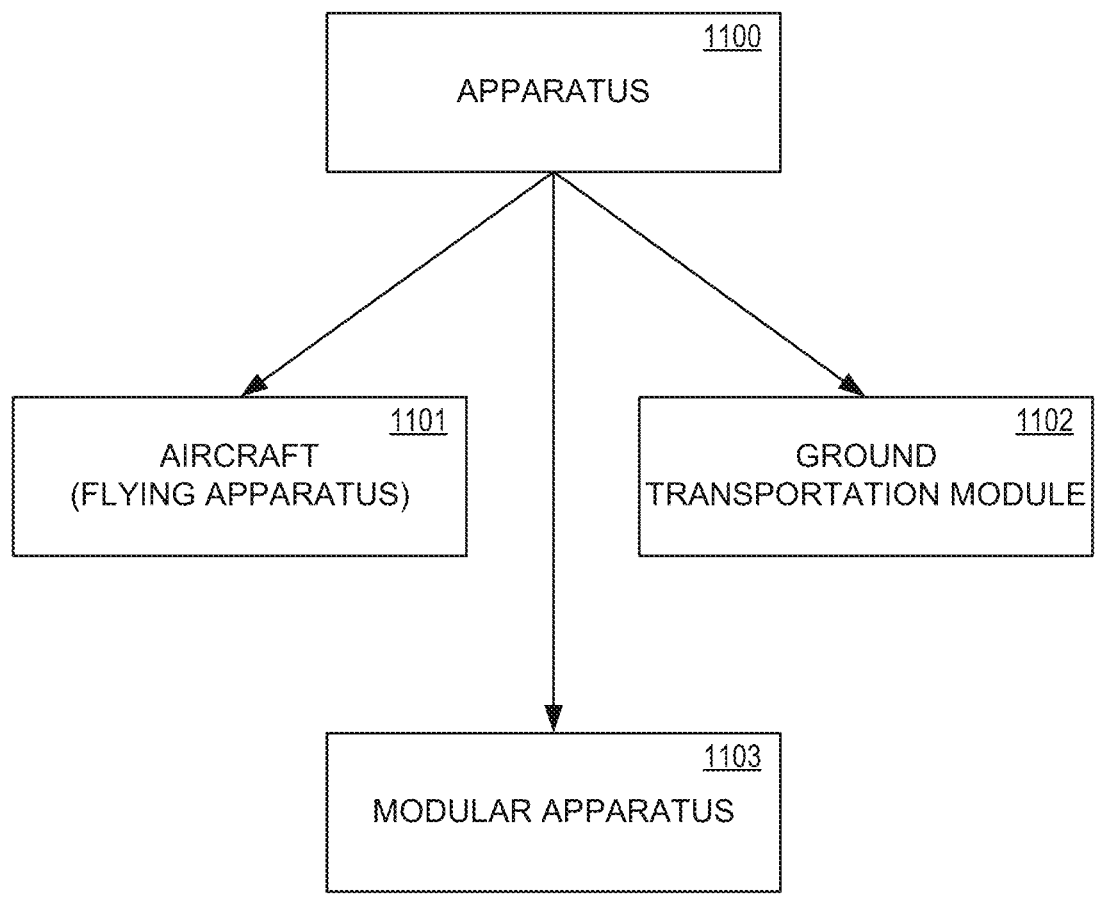
FIG. 11 is a block diagram of an apparatus 1100 for which various aspects of the disclosure may be advantageously employed in accordance with an example.
Figure 12:
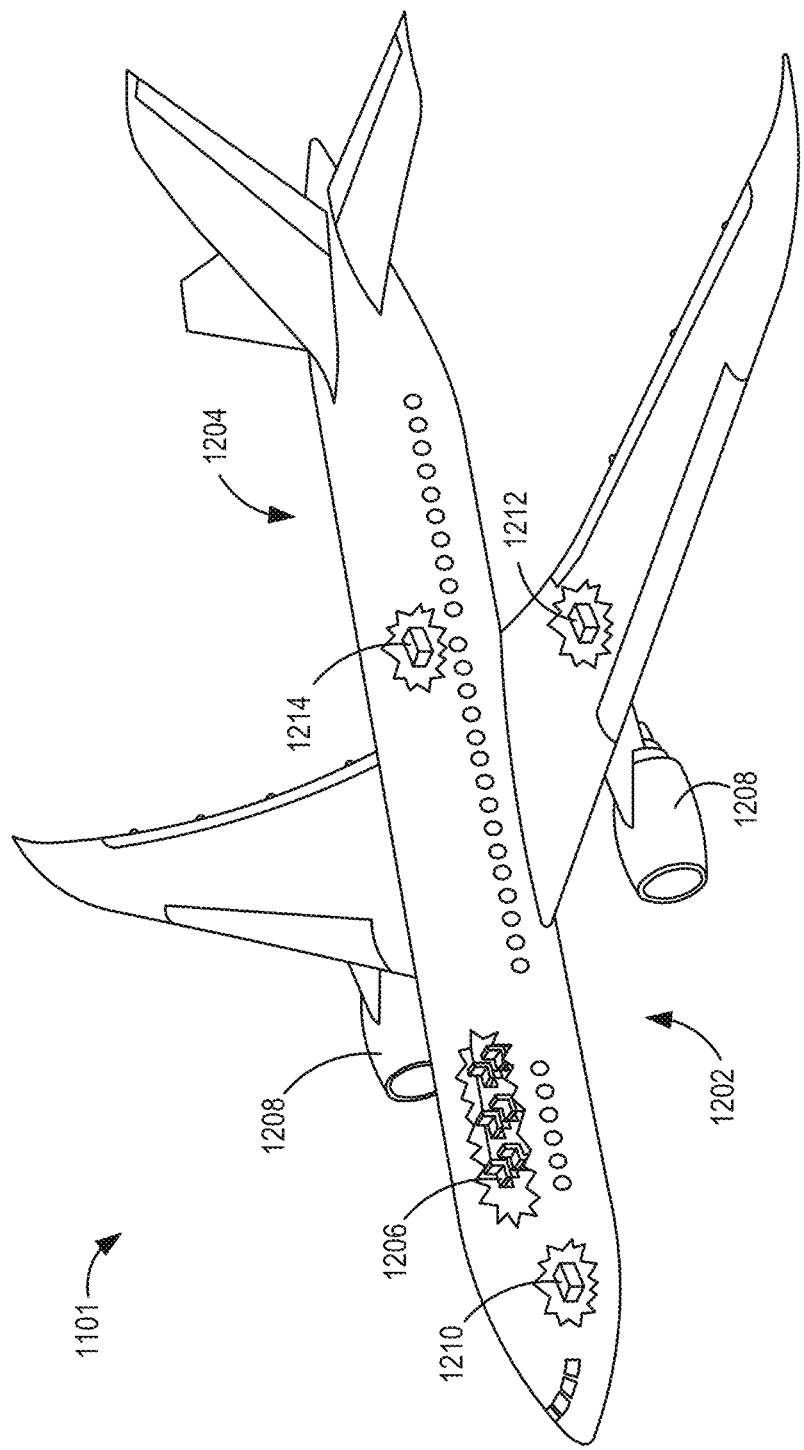
FIG. 12 is a schematic perspective view of a particular flying apparatus 1101 in accordance with an example.

Some examples of the disclosure are used in manufacturing and service applications as shown and described in relation to FIGS. 10-12. Thus, examples of the disclosure are described in the context of an apparatus of manufacturing and service method 1000 shown in FIG. 10 and apparatus 1100 shown in FIG. 11. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, satellite, planetary probe, deep space probe, solar probe, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of fuel receptacle and boom tip position and pose estimation for aerial refueling comprises: receiving a video frame; determining, within the video frame, aircraft keypoints for an aircraft to be refueled; based on at least the aircraft keypoints, determining a position and pose of a fuel receptacle on the aircraft; and determining a position and pose of a boom tip of an aerial refueling boom.

An example system for fuel receptacle and boom tip position and pose estimation for aerial refueling comprises: one or more processors; and a memory storing instructions that, when executed by the one or more processors, cause the one or more processors to perform operations comprising: receiving a video frame; determining, within the video frame, aircraft keypoints for an aircraft to be refueled; based on at least the aircraft keypoints, determining a position and pose of a fuel receptacle on the aircraft; and determining a position and pose of a boom tip of an aerial refueling boom.

An example computer program product comprises a computer usable medium having a computer readable program code embodied therein, the computer readable program code adapted to be executed to implement a method of fuel receptacle and boom tip position and pose estimation for aerial refueling, the method comprises: receiving a video frame; determining, within the video frame, aircraft keypoints for an aircraft to be refueled; based on at least the aircraft keypoints, determining a position and pose of a fuel receptacle on the aircraft; and determining a position and pose of a boom tip of an aerial refueling boom.

Alternatively, or in addition to the other examples described herein, examples include any combination of the following:
  based on at least the position and pose of the fuel receptacle and the position and pose of the boom tip, controlling the aerial refueling boom to engage the fuel receptacle
  a boom control that controls the aerial refueling boom to engage the fuel receptacle;
  the video frame is provided by a single camera;
  the video frame is monocular;
  receiving a video stream comprising the video frame and a plurality of additional video frames;
  selecting a 3D aircraft model based on at least the aircraft to be refueled;
  determining, within the video frame, an aircraft bounding box for the aircraft to be refueled;

determining the aircraft bounding box comprises determining the aircraft bounding box using a first NN, the first NN comprising a CNN;
cropping the video frame to the aircraft bounding box;
determining the aircraft keypoints comprises determining the aircraft keypoints using a second NN, the second NN comprising a CNN;
determining the aircraft keypoints comprises using a CNN to generate an aircraft keypoint heatmap of the aircraft keypoints;
determining the aircraft keypoints comprises determining the aircraft keypoints within the aircraft bounding box;
determining the aircraft keypoints comprises generating an aircraft keypoint heatmap of the aircraft keypoints;
generating the aircraft keypoint heatmap comprises determining a confidence value for each aircraft keypoint;
representing the aircraft keypoints in the aircraft keypoint heatmap with Gaussian point spread representations corresponding to the confidence values for the aircraft keypoints;
filtering out aircraft keypoints in the aircraft keypoint heatmap having confidence values below a threshold;
determining the position and pose of the fuel receptacle comprises performing a 2D to 3D transform for the aircraft keypoints;
determining the position and pose of the fuel receptacle comprises determining a position and pose of the aircraft;
the 2D to 3D transform for the aircraft keypoints uses a PnP algorithm;
determining the position and pose of the fuel receptacle comprises identifying aircraft keypoints associated with a fiducial marker;
the position and pose of the fuel receptacle represent 6DOF;
determining, within the video frame, a boom tip bounding box for the boom tip;
determining the boom tip bounding box comprises determining the boom tip bounding box using a third NN, the third NN comprising a CNN;
determining, within the video frame, a boom tip bounding box for the boom tip using boom control parameters and camera calibration information;
cropping the video frame to the boom tip bounding box;
determining, within the boom tip bounding box, a boom tip keypoint for the boom tip;
based on at least the boom tip keypoint, determining the position and pose of the boom tip;
determining the boom tip keypoint comprises determining the boom tip keypoint using a fourth NN, the fourth NN comprising a CNN;
determining the boom tip keypoint comprises determining the boom tip keypoint within the boom tip bounding box;
determining the boom tip keypoint comprises generating a boom tip keypoint heatmap of the boom tip keypoint;
generating the boom tip keypoint heatmap comprises determining a confidence value for the boom tip keypoint;
representing the boom tip keypoint in the boom tip keypoint heatmap with a Gaussian point spread representation;
determining the position and pose of the boom tip comprises performing a 2D to 3D transform for the boom tip keypoint;
filtering at least one of the aircraft bounding box, the aircraft keypoint heatmap, the position and pose of the aircraft, the position and pose of the fuel receptacle, the boom tip bounding box, the boom tip keypoint heatmap, or the position and pose of the boom tip with a Kalman filter;
controlling the aerial refueling boom to engage the fuel receptacle comprises tracking a distance between the boom tip and the fuel receptacle;
controlling the aerial refueling boom to engage the fuel receptacle comprises determining boom control parameters to close the distance between the boom tip and the fuel receptacle;
based on at least the position and pose of the fuel receptacle and the position and pose of the boom tip, determining whether controlling the aerial refueling boom to engage the fuel receptacle is within safety parameters;
based on at least determining that controlling the aerial refueling boom to engage the fuel receptacle is not within safety parameters, generating an alert;
based on at least the position and pose of the aircraft, overlaying an aircraft model projection in the video frame;
based on at least the position and pose of the boom tip, overlaying a boom model projection in the video frame;
displaying the video frame with the overlay of the aircraft model projection and/or the overlay of the boom model projection;
obtaining one or more 3D aircraft models and a 3D boom model;
identifying points on the aircraft model that correspond to detectable keypoints in 2D images;
generating training images for the first NN using a simulator that sweeps the aircraft model through various 6DoF values to produce a set of aircraft images and aircraft ground truth data, and labeling the aircraft images using the aircraft ground truth data; generating training images for the second NN using aircraft training heatmaps that correspond to the set of aircraft images, the aircraft training heatmaps having keypoints based on the identified points on the aircraft model, and labeling the aircraft training heatmaps using the aircraft ground truth data;
generating training images for the third NN using a simulator that sweeps the boom model through various 6DoF values to produce a set of boom tip images and boom tip ground truth data, and labeling the boom tip images using the boom tip ground truth data; generating training images for the fourth NN using boom tip training heatmaps that correspond to the set of boom tip images, the boom tip training heatmaps having a keypoint based on a location of the boom tip, and labeling the boom tip training heatmaps using the boom tip ground truth data; and
training the NNs using the training images.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of fuel receptacle and boom tip position and pose estimation for aerial refueling, the method comprising:
  receiving a video frame;
  determining via a first pipeline, within the video frame, a plurality of aircraft keypoints for an aircraft to be refueled, wherein the first pipeline performs operations including:
    generating an aircraft keypoint heatmap based on the plurality of aircraft keypoints in a first region of the video frame containing the aircraft to be refueled, wherein each of the plurality of aircraft keypoints corresponds to a region of pixels in the aircraft keypoint heatmap having values dropping, according to a probability density function, with increasing distance from the center of the region of pixels; and
    applying a first threshold to the aircraft keypoint heatmap to eliminate aircraft keypoints having a low confidence level;
  based on at least the plurality of aircraft keypoints, determining via the first pipeline a position and pose of a fuel receptacle on the aircraft;
  determining via a second pipeline a position and pose of a boom tip of an aerial refueling boom, wherein the second pipeline operates in parallel with the first pipeline, and wherein the second pipeline performs operations including:
    generating a boom tip keypoint heatmap based on one or more boom tip keypoints in a second region of the video frame containing the boom tip, wherein each of the one or more boom tip keypoints corresponds to a region of pixels in the boom tip keypoint heatmap having values dropping, according to a probability density function, with increasing distance from the center of the region of pixels; and
    applying a second threshold to the boom tip keypoint heatmap to eliminate boom tip keypoints having a low confidence level; and
  based on at least the position and pose of the fuel receptacle and the position and pose of the boom tip, controlling the aerial refueling boom to engage the fuel receptacle;
  generating a second video frame, wherein generating the second video frame comprises one or more of:
    based on at least the position and pose of the aircraft, overlaying an aircraft model projection in the first video frame; or
    based on at least the position and pose of the boom tip, overlaying a boom model projection in the first video frame: and
  displaying the second videoframe with one or more of the overlay of the aircraft model projection or the overlay of the boom model projection.

2. The method of claim 1, wherein the video frame is provided by a single camera.

3. The method of claim 1, further comprising:
  determining via the first pipeline, within the video frame, an aircraft bounding box for the aircraft to be refueled using a neural network (NN), the NN comprising a convolutional neural network (CNN); and
  cropping the video frame to the aircraft bounding box, wherein determining the aircraft keypoints comprises determining the aircraft keypoints within the aircraft bounding box.

4. The method of claim 1, wherein generating the aircraft keypoint heatmap comprises:
  using a convolutional neural network (CNN).

5. The method of claim 1, wherein determining the position and pose of the boom tip comprises:
  determining via the second pipeline, within the video frame, a boom tip bounding box for the boom tip using boom control parameters and camera calibration information; and
  determining, within the boom tip bounding box, a boom tip keypoint for the boom tip.

6. The method of claim 1, further comprising:
  displaying the video frame with one or more of an overlay of an aircraft model projection or an overlay of a boom model projection.

7. A system for fuel receptacle and boom tip position and pose estimation for aerial refueling, the system comprising:
  one or more processors; and
  a memory storing instructions that, when executed by the one or more processors, cause the one or more processors to perform operations comprising:
    receiving a video frame;
    determining via a first pipeline, within the video frame, a plurality of aircraft keypoints for an aircraft to be refueled, wherein the first pipeline performs operations including:
      generating an aircraft keypoint heatmap based on the plurality of aircraft keypoints in a first region in the video frame containing the aircraft to be refueled, wherein each of the plurality of aircraft keypoints corresponds to a region of pixels in the aircraft keypoint heatmap having values dropping, according to a probability density function, with increasing distance from the center of the region of pixels; and
      applying a first threshold to the aircraft keypoint heatmap to eliminate aircraft keypoints having a low confidence level;
    based on at least the plurality of aircraft keypoints, determining via the first pipeline a position and pose of a fuel receptacle on the aircraft;
    determining via a second pipeline a position and pose of a boom tip of an aerial refueling boom, wherein the second pipeline operates in parallel with the first pipeline, and wherein the second pipeline performs operations including:
      generating a boom tip keypoint heatmap based on one or more boom tip keypoints in a second region in the video frame containing the boom tip, wherein each of the one or more boom tip keypoints corresponds to a region of pixels in the boom tip keypoint heatmap having values dropping, according to a probability density function, with increasing distance from the center of the region of pixels; and
      applying a second threshold to the boom tip keypoint heatmap to eliminate boom tip keypoints having a low confidence level; and
    based on at least the position and pose of the fuel receptacle and the position and pose of
    generating a second video frame, whereingenerating the second videoframe comprises one or more of:
      based on at least the position and pose of the aircraft, overlaying an aircraft model projection in the first video frame; or based on at least the position and pose of the boom tip, overlaying a boom model projection in the first video frame; and displaying the second videoframe with one or more of the overlay of the aircraft model projection or the overlay of the boom model projection.

8. The system of claim 7, wherein the operations further comprise:

determining via the first pipeline, within the video frame, an aircraft bounding box for the aircraft to be refueled using a neural network (NN), the NN comprising a convolutional neural network (CNN); and cropping the video frame to the aircraft bounding box, wherein determining the aircraft keypoints comprises determining the aircraft keypoints within the aircraft bounding box.

9. The system of claim 7, wherein generating the aircraft keypoint heatmap comprises:

using a convolutional neural network (CNN).

10. The system of claim 7, wherein determining the position and pose of the fuel receptacle comprises:

performing a two-dimensional (2D) to three-dimensional (3D) transform for the aircraft keypoints using a perspective-n-point (PnP) algorithm that utilizes correspondences between the 2D locations of pixels corresponding to the aircraft keypoints and the 3D locations of keypoints in an object model of the aircraft, to position the object model such that the view of the 2D locations matches the view of the 3D locations of keypoints, and to determine the position and pose of the aircraft, and determining the position and pose of the fuel receptacle based on the position and pose of the aircraft.

11. The system of claim 7, wherein determining the position and pose of the boom tip comprises:

determining via the second pipeline, within the video frame, a boom tip bounding box for the boom tip using boom control parameters and camera calibration information; and determining, within the boom tip bounding box, a boom tip keypoint for the boom tip.

12. The system of claim 7, wherein the operations further comprise:

displaying the video frame with one or more of an overlay of an aircraft model projection or an overlay of a boom model projection.

13. A computer program product, comprising a non-transitory computer usable medium having a computer readable program code embodied therein, the computer readable program code adapted to be executed to implement a method of fuel receptacle and boom tip position and pose estimation for aerial refueling, the method comprising:

receiving a first video frame;

determining via a first pipeline, within the first video frame, a plurality of aircraft keypoints for an aircraft to be refueled, wherein the first pipeline performs operations including:

generating an aircraft keypoint heatmap based on the plurality of aircraft keypoints in a first region of the first video frame containing the aircraft to be refueled, wherein each of the plurality of aircraft keypoints corresponds to a region of pixels in the aircraft keypoint heatmap having values dropping, according to a probability density function, with increasing distance from the center of the region of pixels; and applying a first threshold to the aircraft keypoint heatmap to eliminate aircraft keypoints having a low confidence level;

based on at least the plurality of aircraft keypoints, determining via the first pipeline a position and pose of a fuel receptacle on the aircraft;

determining via a second pipeline a position and pose of a boom tip of an aerial refueling boom, wherein the second pipeline operates in parallel with the first pipeline, and wherein the second pipeline performs operations including:

generating a boom tip keypoint heatmap based on one or more boom tip keypoints in a second region of the first video frame containing the boom tip, wherein each of the one or more boom tip keypoints corresponds to a region of pixels in the boom tip keypoint heatmap having values dropping, according to a probability density function, with increasing distance from the center of the region of pixels; and applying a second threshold to the boom tip keypoint heatmap to eliminate boom tip keypoints having a low confidence level;

based on at least the position and pose of the fuel receptacle and the position and pose of the boom tip, controlling the aerial refueling boom to engage the fuel receptacle;

generating a second video frame, wherein generating the second video frame comprises one or more of:

based on at least the position and pose of the aircraft, overlaying an aircraft model projection in the first video frame; or based on at least the position and pose of the boom tip, overlaying a boom model projection in the first video frame; and displaying the second video frame with one or more of the overlay of the aircraft model projection or the overlay of the boom model projection.

14. The computer program product of claim 13, wherein the first video frame is provided by a single camera.

15. The computer program product of claim 13, wherein the method further comprises:

determining via the first pipeline, within the first video frame, an aircraft bounding box for the aircraft to be refueled using a neural network (NN), the NN comprising a convolutional neural network (CNN); and cropping the first video frame to the aircraft bounding box, wherein determining the aircraft keypoints comprises determining the aircraft keypoints within the aircraft bounding box.

16. The computer program product of claim 13, wherein generating the aircraft keypoint heatmap comprises:

using a convolutional neural network (CNN).

17. The computer program product of claim 13, wherein determining the position and pose of the fuel receptacle comprises:

performing a two-dimensional (2D) to three-dimensional (3D) transform for the aircraft keypoints using a perspective-n-point (PnP) algorithm that utilizes correspondences between the 2D locations of pixels corresponding to the aircraft keypoints and the 3D locations of keypoints in an object model of the aircraft, to position the object model such that the view of the 2D locations matches the view of the 3D locations of keypoints, and to determine the position and pose of the aircraft, and determining the position and pose of the fuel receptacle based on the position and pose of the aircraft.

18. The computer program product of claim 13, wherein determining the position and pose of the boom tip comprises:
- determining via the second pipeline, within the first video frame, a boom tip bounding box for the boom tip using boom control parameters and camera calibration information; and
- determining, within the boom tip bounding box, a boom tip keypoint for the boom tip.

19. The method of claim 1, further comprising:
- determining via the second pipeline, within the video frame, a boom tip bounding box for the boom tip using a neural network (NN), the NN comprising a convolutional neural network (CNN); and
- cropping the video frame to the boom tip bounding box.

20. The system of claim 7, wherein the operations further comprise:
- determining via the second pipeline, within the video frame, a boom tip bounding box for the boom tip using a neural network (NN), the NN comprising a convolutional neural network (CNN); and
- cropping the video frame to the boom tip bounding box.

\* \* \* \* \*